United States Patent
Toyama et al.

(10) Patent No.: US 11,949,100 B2
(45) Date of Patent: *Apr. 2, 2024

(54) CATHODE ACTIVE MATERIAL USED FOR LITHIUM ION SECONDARY BATTERY AND LITHIUM ION SECONDARY BATTERY

(71) Applicant: Proterial, Ltd., Tokyo (JP)

(72) Inventors: Tatsuya Toyama, Tokyo (JP); Shin Takahashi, Tokyo (JP); Hisato Tokoro, Tokyo (JP); Genei Nakajima, Tokyo (JP); Shuichi Takano, Tokyo (JP); Akira Gunji, Tokyo (JP); Akihiko Noie, Tokyo (JP)

(73) Assignee: Proterial, Ltd., Tokyo (JP)

( * ) Notice: Subject to any disclaimer, the term of this patent is extended or adjusted under 35 U.S.C. 154(b) by 866 days.

This patent is subject to a terminal disclaimer.

(21) Appl. No.: 16/978,271

(22) PCT Filed: Mar. 4, 2019

(86) PCT No.: PCT/JP2019/008444
§ 371 (c)(1),
(2) Date: Sep. 4, 2020

(87) PCT Pub. No.: WO2019/172193
PCT Pub. Date: Sep. 12, 2019

(65) Prior Publication Data
US 2021/0013505 A1    Jan. 14, 2021

(30) Foreign Application Priority Data
Mar. 7, 2018    (JP) .................................. 2018-040929

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
CPC .. H01M 4/505; H01M 4/525; H01M 10/0525; H01M 2004/021;
(Continued)

(56) References Cited

U.S. PATENT DOCUMENTS 5,393,622 A    2/1995 Nitta et al.
5,626,635 A    5/1997 Yamaura et al.
(Continued)

FOREIGN PATENT DOCUMENTS

JP    05-283076 A    10/1993
JP    06-096768 A    4/1994
(Continued)

OTHER PUBLICATIONS

Extended European Search Report dated Nov. 22, 2021 for European Patent Application No. 19763535.2.
(Continued)

*Primary Examiner* — Jane J Rhee
(74) *Attorney, Agent, or Firm* — Volpe Koenig

(57) ABSTRACT

The present invention is to provide a cathode active material used for a lithium ion secondary battery which has a large charge-discharge capacity, and excels in charge-discharge cycle properties, output properties and productivity, and, a lithium ion secondary battery using the same. The cathode active material used for a lithium ion secondary battery comprises a lithium transition metal composite oxide represented by the following Formula (1); $Li_{1+a}Ni_bCo_cMn_dM_eO_{2+\alpha}$, where, in the formula (1), M is at least one metal element other than Li, Ni, Co, and Mn; and a, b, c, d, e, and $\alpha$ satisfy the following conditions: $-0.04 \le a \le 0.04$,
(Continued)

$0.80 \leq b < 1.00$, $0 \leq c \leq 0.04$, $0 < d < 0.20$, $b+c+d+e=1$, $-0.2 < \alpha < 0.2$, and c and d in the Formula (1) satisfy $c/d \leq 0.75$.

18 Claims, 6 Drawing Sheets

(51) Int. Cl.
*H01M 4/525* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2002/74* (2013.01); *C01P 2002/78* (2013.01); *C01P 2006/12* (2013.01); *C01P 2006/40* (2013.01); *H01M 2004/021* (2013.01); *H01M 2004/028* (2013.01)

(58) Field of Classification Search
CPC .......... H01M 2004/028; C01P 2002/52; C01P 2002/74; C01P 2002/78; C01P 2006/12; C01P 2006/40
See application file for complete search history.

(56) References Cited

U.S. PATENT DOCUMENTS

| | | | |
|---|---|---|---|
| 5,981,106 A * | 11/1999 | Amine | C01B 13/366 423/599 |
| 6,040,090 A | 3/2000 | Sunagawa et al. | |
| 2011/0269018 A1* | 11/2011 | Kono | H01M 4/366 429/231.1 |
| 2012/0270107 A1 | 10/2012 | Toya et al. | |
| 2012/0319040 A1 | 12/2012 | Okamoto et al. | |
| 2015/0010819 A1 | 1/2015 | Lee et al. | |
| 2015/0147653 A1 | 5/2015 | Nomura et al. | |
| 2017/0338485 A1 | 11/2017 | Toya et al. | |
| 2017/0346128 A1 | 11/2017 | Fujii et al. | |
| 2018/0145318 A1 | 5/2018 | Endo et al. | |
| 2018/0205080 A1 | 7/2018 | Toya et al. | |
| 2019/0115596 A1 | 4/2019 | Kajiyama et al. | |
| 2020/0044250 A1 | 2/2020 | Toya et al. | |

FOREIGN PATENT DOCUMENTS

| | | |
|---|---|---|
| JP | 08-171910 A | 7/1996 |
| JP | H11025957 A | 1/1999 |
| JP | 2000133249 A | 5/2000 |
| JP | 2000149923 A | 5/2000 |
| JP | 2001-110419 A | 4/2001 |
| JP | 2003-017049 A | 1/2003 |
| JP | 2004-335152 A | 11/2004 |
| JP | 2011-082150 A | 4/2011 |
| JP | 2011116580 A | 6/2011 |
| JP | 2013120676 A | 6/2013 |
| JP | 2013120678 A | 6/2013 |
| JP | 2015018803 A | 1/2015 |
| JP | 2015056368 A | 3/2015 |
| JP | 2015103331 A | 6/2015 |
| JP | 2016-122546 A | 7/2016 |
| JP | 2016207278 A | 12/2016 |
| JP | 2017-188428 A | 10/2017 |
| WO | 2010/147179 A1 | 12/2010 |
| WO | 2011135953 A1 | 11/2011 |
| WO | 2011/108598 A1 | 6/2013 |
| WO | 2016/103511 A1 | 6/2016 |
| WO | 2016190419 A1 | 12/2016 |

OTHER PUBLICATIONS

International Search Report, PCT/JP2019/008444, dated Jun. 4, 2019, 2 pgs.
Notice of Opposition mailed by the Japanese Patent Office dated Sep. 27, 2023 for Japanese Patent No. 7272345.

\* cited by examiner

CATHODE ACTIVE MATERIAL USED FOR LITHIUM ION SECONDARY BATTERY AND LITHIUM ION SECONDARY BATTERY

TECHNICAL FIELD

The present invention relates to a cathode active material used for a lithium ion secondary battery, and, lithium ion secondary battery using the same.

BACKGROUND ART

Lithium ion secondary batteries have been widely used as a lightweight secondary battery having a high energy density. The lithium ion secondary battery is featured by its high energy density and small memory effect, as compared with other secondary batteries such as nickel hydride storage battery and nickel cadmium storage battery. Hence its applications are expanding from small-sized power sources for mobile electronic devices and home electric appliances; up to middle- to large-sized power sources including stationary power sources such as power storage device, uninterruptible power supply and power leveling device, as well as driving power sources for vessels, railway vehicles, hybrid railway vehicles, hybrid cars, and electric cars.

As its applications expand, a lithium ion secondary battery is further required to have a larger capacity. Also excellent charge-discharge cycle properties, and output properties adapted to applications are required. Applications for stationary power sources and driving power sources have strong demands for a higher output, meanwhile applications for vehicles have strong demands for an output stability that enables EV driving over longer distances. Desired are output properties relating to stability over a discharge period, and capability of sustaining high output driving irrespective of state of charge (SOC).

Under such a situation, researches have been made on cathode active materials which largely affect battery properties, in pursuit of a larger capacity or mass-producibility, as well as a reduced resistivity of a lithium ion and a stabilized crystal structure. A lithium-transition metal composite oxide having an α-NaFeO$_2$ type crystal structure (may occasionally referred to as "layered structure", hereinafter) has widely been known as the cathode active material used for a lithium ion secondary battery. While LiCoO$_2$ has been used as an oxide having such a layered structure, existing demands on a higher capacity and a mass producibility have pushed forward development of a ternary oxide system represented by Li(Ni, Co, Mn)O$_2$, a Ni-based oxide obtained by hetero element substitution of LiNiO$_2$, etc.

The nickel-based oxide, among from the lithium-transition metal composite oxides having a layered structure, has a disadvantage since it is not always thermally stable. Nonetheless, the nickel-based oxide, composed using nickel which is inexpensive as compared with cobalt or so, and can exhibit a reasonably large capacity, has been expected to be applied in various ways. In particular, chemical compositions with an increased content of nickel relative to metals other than lithium (Ni, Co, Mn, etc.) have increasingly been expected.

For example, Patent Literature 1 describes a cathode active material used for a lithium ion battery with a layered structure, represented by the following formula Li$_x$(Ni$_y$M$_{1-y}$)O$_z$ (M is at least one element selected from Mn, Co, Al, Mg, Cr, Ti, Fe, Nb, Cu and Zr, x is 0.9 to 1.2, y is 0.80 to 0.89, and z is 1.9 or greater).

Patent Literature 2 describes a cathode active material used for a lithium ion battery with a layered structure, represented by the following formula Li$_a$Ni$_x$Co$_y$Mn$_z$M$_b$O$_2$ (M is at least one or two kinds of elements selected from a group including Mg and Al, 0.9<a<1.2, 0.5≤x≤1.0, 0<b<0.1, and x+y+z+b=1.0).

Patent Literature 3 describes an electrode for an electrochemical device having an electrode mixture layer that contains, as an active material, a lithium-containing composite oxide represented by the following general formula (1) Li$_{1+x}$MO$_2$, wherein −0.3≤x≤0.3 holds, M is an element group consisting of at least four elements containing Ni, Mn, and Mg and at least one element selected from Nb, Mo, Ga, W and V, and, assuming ratios of Ni, Mn and Mg relative to the total content of the element group M as a, b and c in a mol % respectively, 70≤a≤97, 0.5<b<30, 0.5<c<30, −10<b−c<10, and −8=(b−c)/c≤8 hold.

Patent Literature 4 describes a cathode active material used for a lithium ion battery that is composed of a powder of a lithium-metal composite oxide represented by LiNi$_{1-x}$M$_x$O$_2$ (M is at least one kind of metal elements selected from a group consisting of Co, Al, Mg, Mn, Ti, Fe, Cu, Zn and Ga, and 0<x≤0.25 holds), whose secondary particle obtained by gathering a plurality of primary particles has a spherical or ellipsoidal shape, and an average compressive strength of the secondary particle is 110 MPa or smaller. FIG. 2 shows a dQ/dV curve for better understanding of a battery state.

CITATION LIST

Patent Literature

Patent Literature 1: WO2011/108598
Patent Literature 2: JP 2016122546 A
Patent Literature 3: JP 2011-082150 A
Patent Literature 4: JP 2004-335152 A

SUMMARY OF THE INVENTION

Technical Problem

A nickel-based oxide with a high nickel content, such as containing 70% or more of nickel relative to metals excluding lithium, is unfortunately difficult to give excellent charge-discharge cycle properties, due to its unstable crystal structure. According to this kind of lithium-transition metal composite oxide, since a large amount of nickel that occupies a transition metal site takes part in charge compensation, so that a valence change between a divalent ion with a large ionic radius and a trivalent ion with a small ionic radius during charging and discharging causes a large lattice distortion. In particular, with a nickel content of 80% or more with the aim of a higher capacity, a crystal will become further difficult to keep stability, being difficult to have a large charge-discharge capacity and excellent charge-discharge cycle properties.

Cobalt, having been widely used as a source material for a cathode active material, is not so stably supplied and is therefore an expensive metal, so that its content is desired to be reduced. According to Patent Literatures 1 and 2, as described in the example embodiments, stability is kept by relatively a large amount of cobalt, and this raises a need for a new technology capable of improving productivity with cost effectiveness of a material. Moreover, Patent Literatures 1 to 4, as described in the example embodiments, employ large amounts of metals other than Ni, Co and Mn when a nickel content is high, thus leaving room for improvement of a charge-discharge capacity, output properties, productivity and so forth.

It is therefore an objective of the present invention to provide a cathode active material used for a lithium ion secondary battery which has a large charge-discharge capacity, and excels in charge-discharge cycle properties, output properties and productivity, and, a lithium ion secondary battery using the same.

Solution to Problem

Aimed at solving the aforementioned problems, a cathode active material used for a lithium ion secondary battery according to the present invention comprises a lithium transition metal composite oxide represented by the following Formula (1): $Li_{1+a}Ni_bCo_cMn_dM_eO_{2+\alpha}$ ... (1) where M is at least one metal element other than Li, Ni, Co, and Mn; a, b, c, d, e, and α are respectively numbers satisfying the following conditions: $-0.04 \leq a \leq 0.04$, $0.80 \leq b < 1.00$, $0 \leq c \leq 0.04$, $0 < d < 0.20$, $b+c+d+e=1$, $-0.2 < \alpha < 0.2$, wherein c and d in the Formula (1) satisfy $c/d \leq 0.75$.

A lithium ion secondary battery according to the present invention has a cathode that contains the aforementioned cathode active material used for a lithium ion secondary battery.

Advantageous Effects of Inventory

The present invention can provide a cathode active material used for a lithium ion secondary battery which has a large charge-discharge capacity, and excels in charge-discharge cycle properties, output properties and productivity, and, a lithium ion secondary battery using the same.

DESCRIPTION OF EMBODIMENTS

Figure 1:
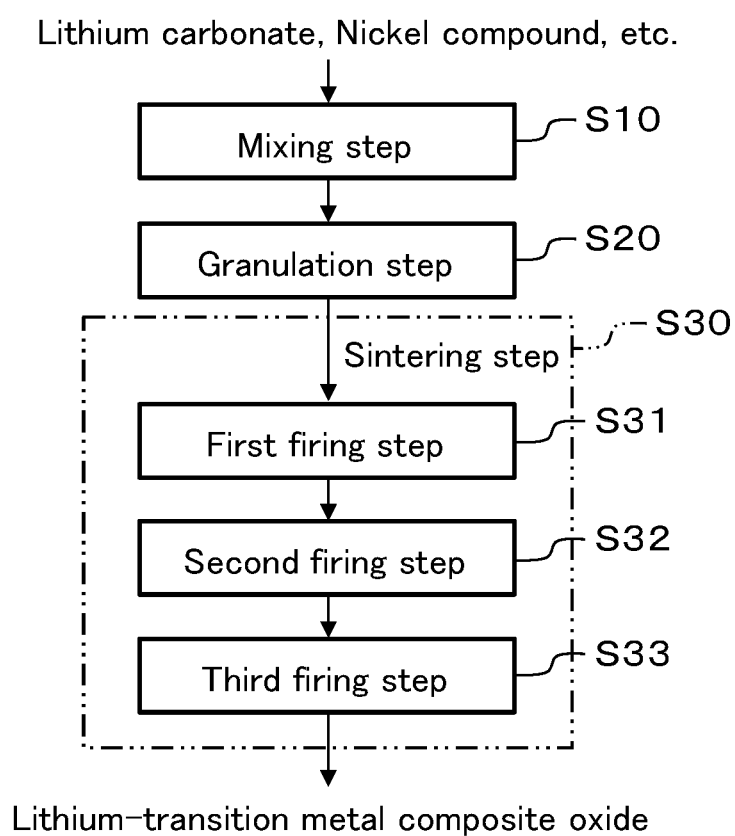
FIG. 1 is a flow chart illustrating an exemplary method for manufacturing a cathode active material used for a lithium ion secondary battery.

A cathode active material used for a lithium ion secondary battery according to an embodiment of the present invention, and, a lithium ion secondary battery using the same will be detailed below. Note, in the description below, the cathode active material used for a lithium ion secondary battery according to this embodiment may simply be referred to as "cathode active material" on occasions.

<Cathode Active Material>

The cathode active material according to this embodiment comprises a lithium-transition metal composite oxide having an $\alpha$-$NaFeO_2$ type crystal structure having a layer structure and having lithium and transition metal contained therein. The cathode active material is mainly composed of primary particle and secondary particle of the lithium-transition metal composite oxide. The lithium-transition metal composite oxide has, as a major phase, a layered structure that allows a lithium ion to intercalate therein or deintercalate therefrom.

The cathode active material according to this embodiment may contain, besides the lithium-transition metal composite oxide as a major ingredient, inevitable impurities derived from source materials or occurring during manufacturing processes; other ingredients covering particles of the lithium-transition metal composite oxide, such as a boron component, a phosphorus component, a sulfur component, a fluorine component and organic matters; and other components mixed with a particle of the lithium-transition metal composite oxide.

The lithium-transition metal composite oxide according to this embodiment is represented by the following formula (1):

$$Li_{1+a}Ni_bCo_cMn_dMeO_{2+\alpha} \qquad (1)$$

where, in the formula (1), M is at least one metal element other than Li, Ni Co, and Mn; and a, b, c, d, e and α are respectively numbers satisfying $-0.04 \leq a \leq 0.04$, $0.80 \leq b < 1.00$, $0 \leq c \leq 0.04$, $0 < d < 0.20$, $b+c+d+e=1$, and $-0.2 < \alpha < 0.2$.

The lithium-transition metal composite oxide represented by the following formula (1) has a nickel content, relative to metals excluding lithium, of 80% or more. That is, the content of Ni is 80 at % or more in a proportion of the number of atoms relative to a total content of Ni, Co, Mn, and M. This is a nickel-based oxide capable of achieving a high charge-discharge capacity, as a result of a high nickel content. With such a high nickel content, the oxide needs less expensive source materials as compared with $LiCoO_2$ or the like, and is thus advantageous in terms of productivity with cost effectiveness of a material.

Most of lithium-transition metal composite oxides with a high nickel content is likely to destabilize its crystal structure during charging and discharging. In the crystal structure, Ni composes layers of $MeO_2$ (Me is a metal element such as Ni). During discharging, lithium ions intercalate between these layers to occupy a lithium site, meanwhile during discharging, the lithium ions deintercalate. A lattice distortion or a change in the crystal structure caused by intercalation and deintercalation of lithium ions affect charge-discharge cycle properties, output properties and so forth.

In the layer composed of $MeO_2$, metal ions that are present in a six-coordination structure ($MeO_6$) are known to have ionic radii, calculated and summarized in Table below.

TABLE 1

| Ion | $Ni^{3+}$ | $Ni^{2+}$ | $Co^{3+}$ | $Mn^{4+}$ | $Ti^{3+}$ | $Ti^{4+}$ | $Al^{3+}$ | $Zr^{4+}$ | $Mg^{2+}$ |
|---|---|---|---|---|---|---|---|---|---|
| Ionic radius [Å] | 0.56 | 0.69 | 0.55 | 0.53 | 0.67 | 0.61 | 0.54 | 0.72 | 0.72 |

The lithium-transition metal composite oxide with a high nickel content has a large amount of nickel at the transition metal site in the layer composed of $MeO_2$. Therefore, a change in nickel valence, which occurs for a charge compensation in association with intercalation and deintercalation of lithium ions, causes a large lattice distortion or a change in a crystal structure, as implied by ionic radii. That is, there is a possibility of a change in a lattice constant, a change in a crystal system, and degraded reversibility during charging and discharging, affecting a charge-discharge capacity, output properties and so forth.

In contrast, this embodiment is designed to reduce a compositional ratio of cobalt that stably exists in a trivalent state, and to increase a compositional ratio of metal elements represented by manganese that stably exists in a tetravalent state and M, so that much of nickel that occupies a transition metal site can exist stably in a divalent state, rather than in a trivalent state. An increase of a ratio of divalent nickel, having a relatively large ionic radius, expands an a-axis lattice constant of a hexagonal unit lattice, and this reduces a lattice distortion or a change in a crystal structure which occur in association with intercalation and deintercalation of lithium ions. Also a diffusion transfer resistance of lithium ions, which is caused in association with intercalation and deintercalation thereof is reduced. Hence, even with a chemical composition having a high nickel content and a large charge-discharge capacity, excellent charge-discharge cycle properties and output properties can be obtained.

Now, significance of a chemical composition represented by the formula (1) will be explained.

In the compositional formula (1), "a" is defined to be −0.04 or greater and 0.04 or smaller. A coefficient "a" is an excess or a deficiency of lithium relative to stoichiometric $Li(Ni,Co,Mn,M)O_2$. The coefficient "a" is not an amount of an input for a synthesis of a material, but is an amount in a lithium-transition metal composite oxide obtained after sintering. Too much excess or deficiency of lithium in the compositional formula (1), that is, a chemical composition in which lithium is excessively poor or excessively rich relative to a total of Ni, Co, Mn and M, tends to have a synthetic reaction not smoothly proceed during sintering, or tends to induce nickel contamination at a lithium site, called cation mixing, or tends to degrade crystallinity. In particular, with a high nickel content equal to or exceeding 80%, such cation mixing or degradation of crystallinity will be more distinctive, making a charge-discharge capacity and charge-discharge cycle properties more likely to degrade. This may also make it difficult to obtain a high open circuit voltage, possibly increasing an internal resistance and reducing output properties. In contrast, with "a" controlled within the aforementioned range so as to control a lithium content within the range of the present invention, it now becomes possible to reduce cation mixing, to pin $Ni^{2+}$ having a large ionic radius to a transition metal site, to enlarge an a-axis lattice constant, and to thereby improve various battery performances. Hence, a large charge-discharge capacity, good charge-discharge cycle properties, and good output properties can be obtained, despite a nickel-rich chemical composition.

The coefficient "a" is preferably 0.02 or greater and 0.02 or smaller. With "a" being −0.02 or greater and 0.02 or smaller, excess or deficiency of lithium relative to the stoichiometry will be a small level, making a synthetic reaction during sintering proceed more smoothly, and making it less likely to cause cation mixing. Hence, the layered structure with less defect may be formed, and, a large charge-discharge capacity, good charge-discharge cycle properties and good output properties may be obtained. Also for a cathode active material that contains the lithium-transition metal composite oxide represented by the formula (1) as a main component, it is preferable to control a ratio of an atomic concentration (mole number) of lithium contained in the cathode active material, and a total atomic concentration (mole number) of metal elements other than lithium, preferably to 0.96 or greater and 1.04 or smaller, and more preferably to 0.98 or greater and 1.02 or smaller. A sintering precursor obtained by firing may occasionally incorporate other component, so as to accidentally make the reaction ratio during sintering deviated from the stoichiometry. However, within the aforementioned ratio of an atomic concentration, it is more likely that the cation mixing or degradation of crystallinity is controlled, on the basis of the chemical composition represented by the compositional formula (1). Thus obtainable is the cathode active material capable of improving various battery properties.

A coefficient "b" for nickel in the compositional formula (1) is defined to be 0.80 or greater and smaller than 1.00. With "b" being 0.80 or greater, a large charge-discharge capacity is obtainable, as compared with other nickel-based oxide having a low nickel content, or a ternary oxide represented by $Li(Ni, Co, Mn)O_2$. This also successfully reduces an amount of transition metals rarer than nickel, and can therefore reduce a material cost.

The coefficient "b" for nickel may be 0.85 or greater, still may be 0.90 or greater, and even may be 0.92 or greater. The larger the "b" is, the more likely a large charge-discharge capacity is obtained. The coefficient "b" for nickel may be 0.95 or smaller, still may be 0.90 or smaller, and even may be 0.85 or smaller. The smaller the "b" is, the less likely a lattice distortion or a change in a crystal structure occurs in association with intercalation and deintercalation of lithium ions, and the less likely nickel contamination at the lithium site, called cation mixing, or degraded crystallinity is caused during sintering, and the more likely good charge-discharge cycle properties and output properties are obtained.

A coefficient "c" for cobalt in the compositional formula (1) is defined to be 0 or greater and 0.04 or smaller. Cobalt may be added intentionally, or may give a compositional ratio only equivalent to inevitable impurity. Cobalt in the above range results in effects of stabilizing a crystal structure, and of inhibiting nickel contamination at the lithium site, called the cation mixing. A large charge-discharge capacity and good charge-discharge cycle properties are thus obtainable. Meanwhile, excessive cobalt increases a material cost of a cathode active material. This also reduces a ratio of other transition metals including nickel and manganese, possibly resulting in a reduced charge-discharge capacity, or a diminished effect of stabilizing divalent nickel by manganese. In contrast, with "c" controlled within the numerical range described above, it now becomes possible to reduce a material cost of a lithium-transition metal composite oxide having a large charge-discharge capacity, good charge-discharge cycle properties and good output properties.

The coefficient "c" for cobalt may be 0.01 or greater, still may be 0.02 or greater, and even may be 0.03 or greater. The larger the "c" is, the more effectively an effect of elemental substitution with cobalt appears, and the more likely good charge-discharge cycle properties are obtained. The coefficient "c" for cobalt may be 0.03 or smaller and still may be 0.02 or smaller. The smaller the "c" is, the more the material cost can be reduced.

A coefficient "d" for manganese in the compositional formula (1) is defined to be larger than 0 and smaller than 0.20. Addition of manganese enables a charge compensation with manganese that stably exists in a tetravalent state, so that divalent nickel can exist more stably than trivalent nickel. This consequently increases a ratio of divalent nickel having a relatively large ionic radius, also increases the a-axis lattice constant, reduce a lattice distortion or a change in a crystal structure which occurs in association with intercalation and deintercalation of lithium ions, and thus makes it possible to obtain good charge-discharge cycle properties and good output properties. On the other hand, excessive manganese reduces a ratio of the other transition metals including nickel, and may reduce the charge-discharge capacity. In contrast, a large charge-discharge capacity, good charge-discharge cycle properties and good output properties are obtainable, by controlling "d" within the aforementioned numerical range.

The coefficient "d" for manganese may be 0.01 or greater, still may be 0.03 or greater, and even may be 0.05 or greater. The larger the "d" is, the more effectively an effect of stabilizing divalent nickel by manganese, which is stable in a tetravalent state, is obtainable, and thereby, the more likely better charge-discharge cycle properties are obtained. The coefficient "d" for manganese may be 0.15 or smaller, still may be 0.10 or smaller, even may be 0.075 or smaller, and yet may be 0.05 or smaller. The smaller the "d" is, the more a ratio of other transition metal including nickel can be increased, and, the more likely a large charge-discharge capacity can be obtained.

A compositional ratio (c/d) of the coefficient "c" for cobalt and the coefficient "d" for manganese in the compositional formula (1) preferably satisfies c/d≤0.75. With the compositional ratio (c/d) of cobalt and manganese being 0.75 or smaller, it becomes possible to increase a content of Ni which is necessary for a larger capacity, to reduce a content of Co which largely affects a material cost, and to keep a sufficient amount of Mn. Employment of manganese that stably exists in a tetravalent state can increase a ratio of divalent nickel having a relatively large ionic radius, and can increase the a-axis lattice constant, making it possible to inhibit the cation mixing and degradation of crystallinity, and to form a layered structure which is less likely to cause a lattice distortion or a change in a crystal structure which can occur in association with intercalation and deintercalation of lithium ions, and has good crystallinity. Hence, obtainable is a lithium-transition metal composite oxide having a large charge-discharge capacity, good charge-discharge cycle properties, a high open circuit voltage, and good output properties, with a reduced material cost.

The compositional ratio (c/d) of cobalt and manganese is preferably 0.50 or smaller, and more preferably 0.40 or smaller. The smaller the compositional ratio (c/d) is, the more effectively an effect of stabilizing divalent nickel by manganese that stably exists in a tetravalent state is obtainable. Alternatively, reduction of a Co content can reduce the material cost of the cathode active material.

M in the compositional formula (1) preferably is at least one kind of metal element selected from a group of Al, Ti, Zn, Ga, Zr, Mo, Nb, V, Sn, Mg, Ta, Ba, W, and Y. These metals can be a trivalent cation or a tetravalent cation. Hence, with these metals hetero substituted at the transition metal site, a ratio of a divalent nickel having a large ionic radius increases, and thereby an a-axis lattice constant increases. The same effect will be obtained by choosing, as M, an element with a large ionic radius such as Mg or Zr listed in Table 1, since such an element can increase a ratio of a divalent nickel and can increase an a-axis lattice constant. Hence, with a chemical composition including these metal elements, obtainable are better charge-discharge cycle properties and output properties. M in the compositional formula (1) is more preferably Ti, Zr, or Mg, among which Ti is particularly preferable. Ti is preferably used to increase the a-axis lattice constant.

A coefficient "e" for M in the compositional formula (1) is preferably greater than or equal to 0 and smaller than 0.10. The metal element represented by M may be added intentionally or may have a compositional ratio only equivalent to inevitable impurity. If the metal element represented by M is excessive, a ratio of other transition metals including nickel and manganese may decrease, possibly reducing a charge-discharge capacity of the cathode active material or diminishing the effect of stabilizing divalent nickel by manganese. In contrast, with "e" controlled within the numerical range described above, a larger charge-discharge capacity, better charge-discharge cycle properties and better output properties are more likely to be obtained.

The coefficient "e" for M may be 0.01 or greater, still may be 0.03 or greater, and even may be 0.05 or greater. The larger the "e" is, the more effectively an effect of elemental substitution of the metal element represented by M is obtainable. The coefficient "e" for M may be 0.08 or smaller, still may be 0.06 or smaller, and even may be 0.04 or smaller. The smaller the "e" is, the more likely a ratio of other transition metals including nickel and manganese will increase, and the charge-discharge capacity increases. In the case where a metal element represented by M is not added, it reduces the material cost and improves the productivity because the production process is simple.

A coefficient "α" in the compositional formula (1) is defined to be larger than −0.2, and smaller than 0.2. The coefficient "α" represents excess or deficiency of oxygen relative to stoichiometric $Li(Ni,Co,Mn,M)O_2$. With "α" controlled within the aforementioned numerical range, the crystal structure will have less defect, so that such a proper crystal structure makes it possible to obtain large a charge-discharge capacity, good charge-discharge cycle properties and good output properties. The coefficient "α" may be measured by inert gas fusion-infrared absorption spectrometry.

When the nickel-based oxide having a nickel content of 80% or greater is polarized as a cathode, a phase transition occurs as applied voltages to the cathode increase such as from a hexagonal H1 phase to a monoclinic M phase around a cathode potential of 3.7 V, from the M phase to a hexagonal H2 phase around the cathode potential of 4.0 V, and from the H2 phase to a hexagonal H3 phase around the cathode potential of 4.2 V.

Hence, the lithium-transition metal composite oxide represented by the formula (1) preferably gives a dQ/dV curve (curve representing a relation between a voltage V and a dQ/dV), obtainable by differentiating a charge curve (curve representing a relation between the voltage V and a charge capacity Q) by the voltage V, which has a ratio ($h_A/h_B$) of 0.70 or greater, where an $h_A/h_B$ being a ratio of a maximum value of a peak height $h_A$ (a maximum value of the dQ/dV) in a voltage range from 4.1 to 4.3 V (vs Li/Li$^+$), relative to a maximum value of a peak height $h_B$ (a maximum value of the dQ/dV) in a voltage range from 3.7 to 3.8 V (vs Li/Li$^+$). The dQ/dV ratio ($h_A/h_B$) is more preferably 1.00 or greater, and is most typically 3.00 or smaller.

The voltage range from 3.7 to 3.8 V in the dQ/dV curve corresponds to a region where a phase change from the H1 phase to the M phase occurs. In this range, the dQ/dV is preferably small. That is, a large volumetric shrinkage of a crystal is unlikely to be caused, an intercalation reaction can proceed moderately, and the crystal structure is kept stable, similarly in a general ternary system represented by Li(Ni, Co, Mn)$O_2$, or a nickel-based oxide with a nickel content of less than 80%, and for this reason, the lithium-transition metal composite oxide with a large nickel content is suitably charged.

Meanwhile, the voltage range from 4.1 to 4.3 V in the dQ/dV curve corresponds to a region where a phase change from the H2 phase to the H3 phase occurs. In this range, the dQ/dV is preferably large. According to the nickel-based oxide with a nickel content of 80% or greater, such a large dQ/dV is considered to increase an amount of $Ni^{4+}$ as a result of $Ni^{2+}/Ni^{4+}$ reaction, to thereby allow the intercalation reaction to proceed efficiently.

Hence, the larger the dQ/dV value, which is typically 0.70 or greater, is, the higher a utilization ratio of a change in nickel valence is, so that the charge-discharge capacity, the charge-discharge cycle properties, and the output properties can be improved. More specifically, the compositional ratio of cobalt which stably exists in a trivalent state is reduced, and the compositional ratio of manganese is increased, and thereby the ratio of divalent nickel, which is converted up to tetravalent during charging, increases. This successfully balances the large capacity with stability of the crystal structure. Note that, the dQ/dV curve may be obtained by using a cell having a cathode that comprises the lithium-transition metal composite oxide represented by the formula (1), and an anode comprising lithium metal, by differentiating a capacity value by a voltage value in an initial charge curve with a charge-discharge efficiency of 99% or greater.

The lithium-transition metal composite oxide represented by the formula (1) preferably has an X-ray powder diffraction spectrum measured by X-ray diffractometry (XRD) using a CuKα radiation. The X-ray powder diffraction spectrum has an intensity ratio of diffraction peaks $I_{(003)}/I_{(104)}$ of 1.2 or greater, where $I_{(003)}$ is defined as an integrated intensity of a diffraction peak assigned to a Miller index plane (003), and $I_{(104)}$ is defined as an integrated intensity of a diffraction peak assigned to a Miller index (104) plane, which is more preferably 1.3 or greater, and is even more preferably 1.4 or greater. The intensity ratio of the diffraction peaks $I_{(003)}/I_{(104)}$ is preferably less than an intensity ratio (ASTM Card value) of $LiNiO_2$, and is preferably 1.7 or less. Note that, even in a case where a powder particle of the cathode active material should partially contain different crystal structures, and where an X-ray diffraction spectrum obtained by power X-ray diffractometry using a CuKα radiation has peaks, among which a peak assignable to an α-$NaFeO_2$ type crystal structure has larger intensity, the properties of the cathode active material are primarily governed by the α-$NaFeO_2$ type crystal structure. Hence, the cathode active material in such a case is considered to have the α-$NaFeO_2$ type crystal structure.

Most of nickel-based oxides having the α-$NaFeO_2$ type crystal structure has a diffraction peak assignable to a Miller index plane (003) around a diffraction angle 2θ of 18.2 to 19.0°. Meanwhile, a diffraction peak assignable to a Miller index plane (104) appears around a diffraction angle 2θ of 48.3 to 48.7°. An intensity ratio of these diffraction peaks $I_{(003)}/I_{(104)}$ not only represents crystallinity in a c-axis direction, but also indirectly represents a degree of a lattice distortion caused by cation mixing or the like.

The intensity ratio of diffraction peaks $I_{(003)}/I_{(104)}$ being 1.2 or greater indicates that their layered structure is grown enough in the c-axis direction, and a cubic domain which can otherwise appear between the layers due to cation mixing is less, so that a large charge-discharge capacity is obtainable, and a lithium secondary battery having a high open circuit voltage is obtainable. Meanwhile, with the intensity ratio of diffraction peaks $I_{(003)}/I_{(104)}$ being 1.7 or smaller, the crystallinity is high enough but primary particles having a layered structure are not excessively oriented, so that good output properties are obtainable while inhibiting resistivity.

The lithium-transition metal composite oxide represented by the formula (1) preferably has a full width at half maximum of a diffraction peak assigned to a Miller index plane (003) of 0.130° or less, in the X-ray diffraction spectrum obtained by powder X-ray diffractometry using a CuKα radiation, which is more preferably 0.120° or less. The smaller the full width at half maximum of a diffraction peak assigned to the Miller index plane (003), the larger enough the crystallite having a layer structure is, and the less the lattice distortion is with cation mixing inhibited. This makes it possible to obtain a large charge-discharge capacity and good charge-discharge cycle properties, as well as excellent output properties indicated by a high open circuit voltage. A lower limit value of the full width at half maximum of a diffraction peak assigned to the Miller index plane (003) is a detection limit value, and is preferably 0.055° or greater.

The lithium-transition metal composite oxide represented by the formula (1) preferably has an a-axis lattice constant, in a hexagonal unit lattice, of 2.878 Å ($\times 10^{-10}$ m) or greater. Most of lithium-transition metal composite oxides have much of the transition metal sites occupied by a trivalent nickel or a trivalent cobalt, and typically have an a-axis lattice constant less than 2.878 Å. This sort of crystal lattice is often subject to a large change in a crystal structure which occurs in association with intercalation and deintercalation of lithium ions, and tends to easily destabilize the crystal structure. In contrast, with the a-axis lattice constant specified to 2.878 Å or greater, such a change in a crystal structure which occurs in association with intercalation and deintercalation of lithium ions, and internal resistance are reduced, making it possible to obtain a large charge-discharge capacity, good charge-discharge cycle properties, and good output properties. The a-axis lattice constant is more preferably 2.879 Å or greater, and even more preferably 2.880 Å or greater.

The lithium-transition metal composite oxide represented by the formula (1) preferably has a c-axis lattice constant, in a hexagonal unit lattice, of 14.210 Å or greater and 14.240 Å or less.

For the lithium-transition metal composite oxide represented by the formula (1), a site occupancy (seat occupancy) of nickel in a 3a site in the crystal structure belonging to the space group R-3m is preferably less than 4%. The ionic radius of divalent nickel is close to the ionic radius of monovalent lithium, and thus in a general ternary or nickel-based oxide, cation mixing, in which lithium at the 3a site is replaced with nickel, is likely to occur. In the case where the site occupancy of nickel at the 3a site is 4% or more, the amount of lithium that intercalates into and deintercalates from 3a site decreases, making it difficult to provide a large charge-discharge capacity. In addition, in general, the ratio of divalent nickel occupying 3b sites decreases, and the a-axis lattice constant does not increase, making it more likely that a lattice distortion or a change in the crystal structure will increase. In contrast, in the case where the site occupancy of nickel at the 3a site is less than 4%, the lattice distortion and the change in the crystal structure decreases, making it easy to provide a large charge-discharge capacity and excellent charge-discharge cycle properties and output properties.

The site occupancy of nickel at the 3a site can be determined by analyzing, in terms of the crystal structure, the X-ray diffraction spectrum obtained by powder X-ray diffraction measurement using a CuKα ray, by a Rietveld method with a crystal structure model of the space group R-3m and calculating the ratio of the 3a site occupied by nickel relative to all the 3a site. In the crystal structure analysis, refinement is performed on the assumption that the 3a site are occupied by Li or Ni, that the 3b sites are occupied by Li, Ni, Co, Mn, or M, and that the 6c sites are occupied by O.

The lithium-transition metal composite oxide represented by the formula (1) preferably has a BET specific surface area of 0.2 $m^2/g$ or greater, which is more preferably 0.4 $m^2/g$ or greater, and even more preferably 0.6 $m^2/g$ or greater. Meanwhile, the BET specific surface area is preferably 1.5 $m^2/g$ or less, and is more preferably 1.2 $m^2/g$ or less. With the BET specific surface area being 0.2 $m^2/g$ or greater, it is possible to obtain the cathode having sufficiently high levels of molding density and packing density of the cathode active material. On the other hand, with the BET specific surface area being 1.5 $m^2/g$ or less, the lithium-transition metal composite oxide is less likely to brake, be deformed or drop a particle during volumetric changes caused by pressure molding or charging and discharging, and inhibit a binder from being drawn up into pores. This improves coatability and adhesiveness of the cathode active material, and makes it possible to obtain a large charge-discharge capacity, good charge-discharge cycle properties, and output properties.

A crystal structure of the lithium-transition metal composite oxide and so forth can be confirmed, for example, by X-ray diffractometry (XRD). A chemical composition of the lithium-transition metal composite oxide and so forth may be confirmed, for example, by Inductively Coupled Plasma (ICP) emission spectrometry, and Atomic Absorption Spectrometry (AAS).

<Method for Manufacturing Cathode Active Material>

The cathode active material according to this embodiment may be manufactured through a synthetic reaction of lithium with nickel, manganese and so forth, under appropriate sintering conditions, while adjusting a ratio of starting materials so that the lithium-transition metal composite oxide has the chemical composition represented by the compositional formula (1). A method based on a solid phase process will be described below, as an exemplary method for manufacturing the cathode active material according to this embodiment.

FIG. 1 is a flow chart illustrating an exemplary method for manufacturing the cathode active material used for a lithium ion secondary battery, according to an embodiment of the present invention. As seen in FIG. 1, the method for manufacturing the cathode active material used for a lithium ion secondary battery, according to this embodiment, includes a mixing step S10, a granulation step S20, and a sintering step S30, in this order.

In the mixing step S10, a lithium-containing compound is mixed with compounds containing metal elements other than Li, seen in the compositional formula (1). These starting materials may, for example, be individually weighed, ground, and mixed to obtain a powdery mixture in which the starting materials are homogeneously mixed. A grinder used for grinding the starting materials can be any of ordinary fine grinders such as a ball mill, a jet mill, a rod mill, and a sand mill. The starting materials may be dry-ground or wet-ground. Wet grinding using an aqueous medium or the like is preferred, in view of obtaining a homogeneous and fine powder having an average particle diameter of 0.3 μm or less.

The lithium-containing compounds may be, for example, lithium carbonate, lithium acetate, lithium nitrate, lithium hydroxide, lithium chloride, and lithium sulfate. It is preferable to use at least lithium carbonate, as indicated in FIG. 1, and lithium carbonate preferably accounts for 80% by mass or more of the lithium-containing compound. Lithium carbonate is superior to other lithium-containing compounds in terms of supply stability and inexpensiveness, and is therefore easily available. Lithium carbonate is weakly alkaline, causing less damage on manufacturing equipment, and therefore excels in industrial applicability and practicality.

The compounds containing metal elements other than Li are obtained by mixing a nickel-containing compound, a cobalt-containing compound, a manganese-containing compound, and a compound containing a metal element represented by M according to a chemical composition of the lithium-transition metal composite oxide. As the compounds containing metal elements other than Li, compounds having at least any of C, H, O and N, such as carbonate, hydroxide, oxyhydroxide, carbonate, acetate, citrate, and oxide are preferably used. Carbonate, hydroxide or oxide is particularly preferable in view of easiness of being ground, and an amount of emission of a gas caused by thermal decomposition.

In the mixing step S10, the starting materials are preferably mixed so that a sintering precursor, to be fed to the sintering step S30, has the chemical composition represented by compositional formula (1). More specifically, a ratio (mole ratio) of an atomic concentration (mole number) of lithium to be contained in the sintering precursor, and a total atomic concentration (mole number) of metal elements other than lithium to be contained in the sintering precursor, is preferably adjusted to 0.96 or greater and 1.04 or less. If the ratio of the atomic concentration is less than 0.96, lithium runs short, so that sintering is very likely to fail to produce a proper main phase with a less content of a heterogeneous phase. Meanwhile, if the ratio of the atomic concentration exceeds 1.04, the synthetic reaction would not proceed properly, so that the crystallinity of the layered structure would be degraded.

In order to obtain the lithium-transition metal composite oxide, in which a percentage of divalent nickel that occupies the transition metal site is high, and is inhibited from causing a lattice distortion or a change in a crystal structure which occurs in association with intercalation and deintercalation of lithium ions, it is necessary to fully inhibit cation mixing which tends to induce divalent nickel. To sufficiently inhibit the cation mixing during sintering, the synthetic reaction of lithium with nickel, manganese, and the like needs to proceed completely, and hence it is preferable to have lithium react with nickel, manganese, and so forth, with a stoichiometric ratio, that is, approximately 1:1.

Hence, the ratio of atomic concentrations of these elements is preferably adjusted, preliminarily in the mixing step S10 where fine grinding can take place. For preliminary adjustment, the atomic concentration ratio (mole ratio) of the atomic concentration (mole number) of lithium, and the atomic concentration (mole number) of the metal elements, other than lithium, both to be contained in the sintering precursor, is more preferably 0.98 or greater and 1.02 or less. Note, however, that lithium contained in the sintering precursor may react, during sintering, with a sintering vessel or may vaporize. Considering such a partial loss of lithium due to reaction with the sintering vessel or vaporization during sintering, an excessive addition of lithium during a material input is not inevitable.

Again in order to obtain the lithium-transition metal composite oxide in which a percentage of divalent nickel that occupies the transition metal site is high, and is inhibited from causing a lattice distortion or a change in a crystal structure which occurs in association with intercalation and deintercalation of lithium ions, it is preferable to avoid contamination of metal elements other than lithium, such as inevitable impurity occurring during manufacturing processes, other ingredient that covers particle of the lithium-transition metal composite oxide, and other component mixed with a particle of the lithium-transition metal composite oxide, in a period after the mixing step S10 and before the sintering step S30.

In the granulation step S20, the mixture obtained in the mixing step S10 is granulated and particles are bound to obtain a secondary particle (granulated product). The mixture may be granulated either by dry granulation or wet granulation. The mixture may be granulated by an appropriate method such as rolling granulation, fluidized bed granulation, compression granulation, or spray granulation.

Spray granulation is particularly preferable as the method for granulating the mixture. A spray granulator may be of any type, such as a two fluid nozzle-type, a four fluid nozzle-type, and a disk-type. The spray granulation can granulate a slurry of the mixture, having been obtained by fine mixing and grinding based on wet grinding, while concurrently drying the slurry. A particle size of the secondary particle can be precisely controlled within a predetermined range, by controlling a concentration of slurry, a spray pressure, a rotational speed of a disk and so forth, by which a granulated product with a high sphericity and a homogenous chemical composition can be obtained efficiently. In the granulation step S20, the mixture obtained in the mixing step S10 is preferably granulated so as to adjust an average diameter ($D_{50}$) to 5 μm or greater and 30 μm or less.

In the sintering step S30, the granulated product obtained in the granulation step S20 is fired to obtain the lithium-transition metal composite oxide represented by the formula (1). The sintering step S30 may be conducted by a single-stage firing during which a firing temperature is kept within a constant range, or by a multi-stage firing during which the firing temperature is controlled within different ranges. In view of obtaining the lithium-transition metal composite oxide with high purity, a large charge-discharge capacity, good charge-discharge cycle properties and good output properties, the sintering step S30 preferably includes a first firing step S31, a second firing step S32, and a third firing step S33 as illustrated in FIG. 1. In particular, conditions for the second firing step S32 and the third firing step S33 are preferably satisfied.

In the first firing step S31, the granulated product granulated in the granulation step S20 is fired at 200° C. or higher and 600° C. or lower, for 0.5 hours or longer and 5 hours or shorter, to obtain a first precursor. The first firing step S31 is mainly aimed to remove moisture and the like that prevent the synthetic reaction of the lithium-transition metal composite oxide, from the sintering precursor (granulated product produced in the granulation step S20).

At the firing temperature being 200° C. or higher in the first firing step S31, combustion of impurities and thermal decomposition of the staring materials fully proceed, and this successfully inhibits an inert heterogeneous phase or an adherent matter from being formed during subsequent firing. Meanwhile, at the firing temperature being 600° C. or lower, a crystal of the lithium-transition metal composite oxide is almost unlikely to be formed in this step, making it possible to avoid formation of a low-purity crystal phase that otherwise can be formed in the presence of moisture or impurities.

The firing temperature in the first firing step S31 is preferably 250° C. or higher and 550° C. or lower, and more preferably 300° C. or higher and 500° C. or lower. At the firing temperature controlled within such a range, it now become possible to efficiently remove moisture or impurities, and also to certainly prevent a crystal of lithium-transition metal composite oxide from being formed in this step. The firing time in the first firing step S31 can be determined properly, depending for example on the firing temperature, amounts of moisture and impurities in the mixture, target levels of removal of moisture and impurities, and a degree of crystallinity.

The first firing step S31 is preferably conducted under a flow of an atmospheric gas, or under an evacuation by a pump. Firing in such an atmosphere can efficiently remove a gas with moisture and impurities out from a reaction field. A flow rate of an air flow of the atmospheric gas, and an emission volume per unit time by the pump may be set to be higher than a volume of a gas generated from the sintering precursor. The volume of the gas generated from the sintering precursor can be determined, for example, on the basis of an amount of consumption of the starting materials, or, a mole ratio of a component which is to be gasified by combustion or thermal decomposition relative to the starting material.

The first firing step S31 may be conducted in an oxidative gas atmosphere, or in a non-oxidative gas atmosphere, or in a reduced-pressure atmosphere. The oxidative gas atmosphere may be either an oxygen gas atmosphere or an air atmosphere. The reduced-pressure atmosphere may have a pressure equal to or less than an atmospheric pressure and may be a reduced-pressure atmosphere condition having an appropriate degree of a vacuum.

In the second firing step S32, the first precursor obtained in the first firing step S31 is fired at a firing temperature higher than 600° C. and lower than or equal to 750° C. for 2 hours or longer and 50 hours or shorter, to obtain a second precursor. The second firing step S32 is mainly aimed to remove a carbonate component produced from a reaction between lithium carbonate and nickel compound, and to form a crystal of the lithium-transition metal composite oxide. Nickel in the sintering precursor is sufficiently oxidized to prevent contamination of the lithium site with nickel, namely cation mixing, to thereby prevent nickel-induced formation of a cubic domain. Concurrently, in view of reducing a lattice distortion or a change in a crystal structure which occurs in association with intercalation and deintercalation of lithium ions, manganese that stably exists in a tetravalent state and the like are sufficiently oxidized to improve compositional homogeneity of layers composed of $MeO_2$, and to thereby increase a ratio of divalent nickel with a large ionic radius.

In the second firing step S32, lithium carbonate that remained unreacted in the second precursor is preferably reduced to a level of 0.5% by mass or more and 3% by mass or less and more preferably reduced to a level of 0.3% by mass or more and 2% by mass or less, relative to a total mass of an input of the first precursor. If too much lithium carbonate remained in the second precursor, such lithium carbonate may melt in the third firing step S33, to form a liquid phase. The lithium-transition metal composite oxide, if fired in such a liquid phase, may be over-sintered to induce excessive orientation of the layered-structured primary particles, or reduction of a specific surface area, possibly degrading the charge-discharge capacity and the output properties. Meanwhile, if too little lithium carbonate remained in the second precursor, then the specific surface area of the lithium-transition metal composite oxide to be fired becomes too large, possibly degrading the charge-discharge cycle properties due to an expanded contact area with an electrolytic solution. In contrast, with an amount of residual unreacted lithium carbonate controlled within the aforementioned range, obtainable is a large charge-discharge capacity, good charge-discharge cycle properties, and good output properties.

In addition, if the reaction of lithium carbonate in the second firing step S32 is insufficient and a large amount of lithium carbonate is left at the end of the second firing step S32, such lithium carbonate may melt in the third firing step S33, to form a liquid phase. The lithium-transition metal composite oxide, if fired in such a liquid phase, tends to produce a coarse crystal grain, to thereby degrade the output properties. In contrast, if most of lithium carbonate was consumed in the reaction in the second firing step S32, the liquid phase is less likely to be formed in the third firing step S33, so that the crystal grain becomes less likely to be coarsened even at a high firing temperature. This makes it possible to fire the lithium-transition metal composite oxide with high purity of crystal with preventing the crystal grain from coarsening.

In addition, if the reaction of lithium carbonate in the second firing step S32 is insufficient and a large amount of lithium carbonate is left at the end of the second firing step S32, it is difficult for oxygen to spread in the precursor. If oxygen does not spread in the second precursor in the third firing step S33, nickel is not sufficiently oxidized, and cation mixing is easily caused by divalent nickel. In contrast, in the case where most of the lithium carbonate is reacted in the second firing step S32, oxygen easily spreads in the powdery second precursor. Thus, manganese and like are sufficiently oxidized to increase the ratio of divalent nickel in the layers composed of $MeO_2$, and divalent nickel, which easily causes cation mixing, is prevented from remaining excessively.

In the second firing step S32, at a firing temperature higher than 600° C., lithium carbonate, a nickel compound, and the like react to promote a crystal formation, making it possible to prevent a large amount of unreacted lithium carbonate from remaining. Hence, lithium carbonate will be less likely to form a liquid phase in the subsequent firing, the crystal grain is prevented from coarsening, and thereby good output properties are obtained, and oxygen easily spreads in the second precursor, making it more likely that cation mixing is prevented. Meanwhile, at a firing temperature of 750° C. or lower, the grain does not excessively grow in the second firing step S32, so that manganese and the like can be sufficiently oxidized, and thereby the layers composed of $MeO_2$ can improve homogeneity of its chemical composition.

The firing temperature in the second firing step S32 is preferably 620° C. or higher, more preferably 650° C. or higher, and even more preferably 680° C. or higher. The higher the firing temperature is in this way, the more the synthetic reaction is promoted, and the more certainly lithium carbonate is prevented from remaining. In particular, in the case where the coefficient "d" for manganese is larger than 0 and lower than or equal to 0.075, the firing temperature is preferably 650° C. or higher. In the case where the coefficient "d" for manganese is larger than 0.075, the firing temperature only needs to be 680° C. or higher.

The firing temperature in the second firing step S32 is preferably 720° C. or lower. The lower the firing temperature is, the more the grain growth may be inhibited, and the more productivity improves through reduction of unnecessary costs for heating. Also since lithium carbonate becomes less likely to melt, and the liquid phase becomes less likely to be formed, the crystal grain can be more certainly prevented from coarsening.

The firing time in the second firing step S32 is preferably 4 hours or more. Also the firing time is preferably 15 hours or less. With the firing time controlled within such a range, lithium carbonate sufficiently reacts, and a carbonate component can be certainly removed. Also a necessary time for firing is shortened, so that productivity of the lithium-transition metal composite oxide is improved.

The second firing step S32 is preferably conducted in an oxidative atmosphere. An oxygen concentration in an atmosphere is preferably 50% or higher, more preferably 60% or higher, and even more preferably 80% or higher. Meanwhile, a carbon dioxide concentration in the atmosphere is preferably 5% or lower, and more preferably 1% or lower. The second firing step S32 is preferably conducted under a flow of an oxidative gas. Firing under such an oxidative gas flow makes it possible to certainly oxidize nickel, and to certainly remove carbon dioxide emitted into the atmosphere.

In the third firing step S33, the second precursor obtained in the second firing step S32 is fired at a firing temperature higher than 750° C. and lower than or equal to 900° C., for 2 hours or more and 50 hours or less, to obtain the lithium-transition metal composite oxide. The third firing step S33 is mainly aimed to have the crystal grain of the lithium-transition metal composite oxide having the layered structure grow up to an appropriate grain size or specific surface area.

In the third firing step S33, at a firing temperature higher than 750° C., it becomes possible to sufficiently oxidize nickel and inhibit cation mixing, and to have the crystal grain of the lithium-transition metal composite oxide grow up to an appropriate grain size or specific surface area. It is also possible to sufficiently oxidize manganese and the like to thereby increase a proportion of divalent nickel. This forms the main phase having a large a-axis lattice constant and having a reduced lattice distortion or change in the crystal structure which occurs in association with intercalation and deintercalation of lithium ions, making it possible to obtain a large charge-discharge capacity, good charge-discharge cycle properties, and good output properties. Meanwhile, at a firing temperature of 900° C. or lower, lithium becomes less volatile, and the layered structure becomes less decomposable, making it possible to obtain the lithium-transition metal composite oxide with high purity of the crystal, a good charge-discharge capacity, and good output properties.

In the third firing step S33, the firing temperature is preferably 780° C. or higher, more preferably 800° C. or higher, and even more preferably 820° C. or higher. As these temperatures show, the higher the firing temperature is, the more sufficiently nickel, manganese, and the like can be oxidized, making it possible to promote the grain growth of the lithium-transition metal composite oxide.

The firing temperature in the third firing step S33 is preferably 880° C. or lower, and more preferably 860° C. or lower. The lower the firing temperature is in this way, the less likely lithium vaporizes, making it possible to certainly prevent the lithium-transition metal composite oxide from being decomposed, and to obtain the lithium-transition metal composite oxide that excels in a charge-discharge capacity, output properties and so forth.

In the third firing step S33, the firing time is preferably 0.5 hours or more. Also the firing time is preferably 15 hours or less. With the firing time being such levels, nickel, manganese, and the like can be sufficiently oxidized, making it possible to obtain the lithium-transition metal composite oxide with a reduced lattice distortion or change in crystal structure which occurs in association with intercalation and deintercalation of lithium ions. Also a necessary time for firing is shortened, so that the productivity of lithium-transition metal composite oxide can be improved.

The third firing step S33 is preferably conducted in an oxidative atmosphere. An oxygen concentration in the atmosphere is preferably 80% or higher, more preferably 90% or higher, and even more preferably 95% or higher. Meanwhile, a carbon dioxide concentration in the atmosphere is preferably 5% or lower, and more preferably 1% or lower. The third firing step S33 is preferably conducted under a flow of an oxidative gas. Firing under such an oxidative gas flow makes it possible to sufficiently oxidize nickel, manganese, and the like and to certainly remove carbon dioxide emitted into the atmosphere.

In the sintering step S20, firing can be conducted using as an appropriate firing means a rotary furnace such as a rotary kiln; a continuous furnace such as a roller-hearth kiln, a tunnel kiln, and a pusher kiln; and a batch furnace. In each of the first firing step S31, the second firing step S32, and the third firing step S33, the same firing apparatus may be used, or different firing apparatuses may be used. Each firing step may be conducted intermittently with replacing the atmosphere; or may be conducted continuously while the atmospheric gas is continuously discharged. Note that the first firing step S31, which is mainly aimed to remove moisture, is omissible with starting from the second firing step S32 if there is no need to remove moisture derived from the starting material, such as in a case where an oxide, instead of a hydroxide, is used as the starting material. An essential point of the manufacturing process of the present invention is that the second precursor is fired in the third firing step S33, while reducing the amount of lithium carbonate, which remains unreacted in the second precursor, to 0.3% by mass or more and 2% by mass or less, relative to the total mass of an input of the first precursor. The cathode active material of the present invention is obtainable by employing such a process.

The cathode active material, composed of the lithium-transition metal composite oxide represented by the formula (1), may be manufactured by advancing through the aforementioned mixing step S10, the granulation step S20, and the sintering step S30. The intensity ratio of the diffraction peaks $I_{(003)}/I_{(104)}$, the full width at half maximum of the diffraction peak assigned to the Miller index plane (003), the lattice constants, and the site occupancy of nickel at the 3a site, all regarding the lithium-transition metal composite oxide, may be controlled mainly by properly adjusting the compositional ratio of metal elements including nickel and manganese, the amount of lithium carbonate remained unreacted in the second precursor, and the conditions of main sintering in the sintering step S20, such as the firing temperature or the firing time in the third firing step S33. Meanwhile, a dQ/dV ratio ($h_A/h_B$) may be controlled mainly on the basis of the compositional ratio of the metal elements. Efforts directed to the chemical composition represented by the compositional formula (1), so as to sufficiently reduce cation mixing and degradation of crystallinity, and to form the layered structure with an appropriate crystallite size, makes it possible to obtain the cathode active material with a large charge-discharge capacity, good charge-discharge cycle properties, a high open circuit voltage, and good output properties.

For removal of impurities or other purpose, the synthesized lithium-transition metal composite oxide may proceed to a washing step in which washing with deionized water takes place and to a drying step in which the washed lithium-transition metal composite oxide is dried, subsequently to the sintering step S30. Additionally, the synthesized lithium-transition metal composite oxide may proceed to a crushing step in which the synthesized lithium-transition metal composite oxide is crushed, and to a classification step in which the synthesized lithium-transition metal composite oxide is classified according to predetermined particle sizes.

<Lithium Ion Secondary Battery>

Next, a lithium ion secondary battery, whose cathode comprising the cathode active material (cathode active material used for a lithium ion secondary battery) that contains the aforementioned lithium-transition metal composite oxide, will be explained below.

Figure 2:
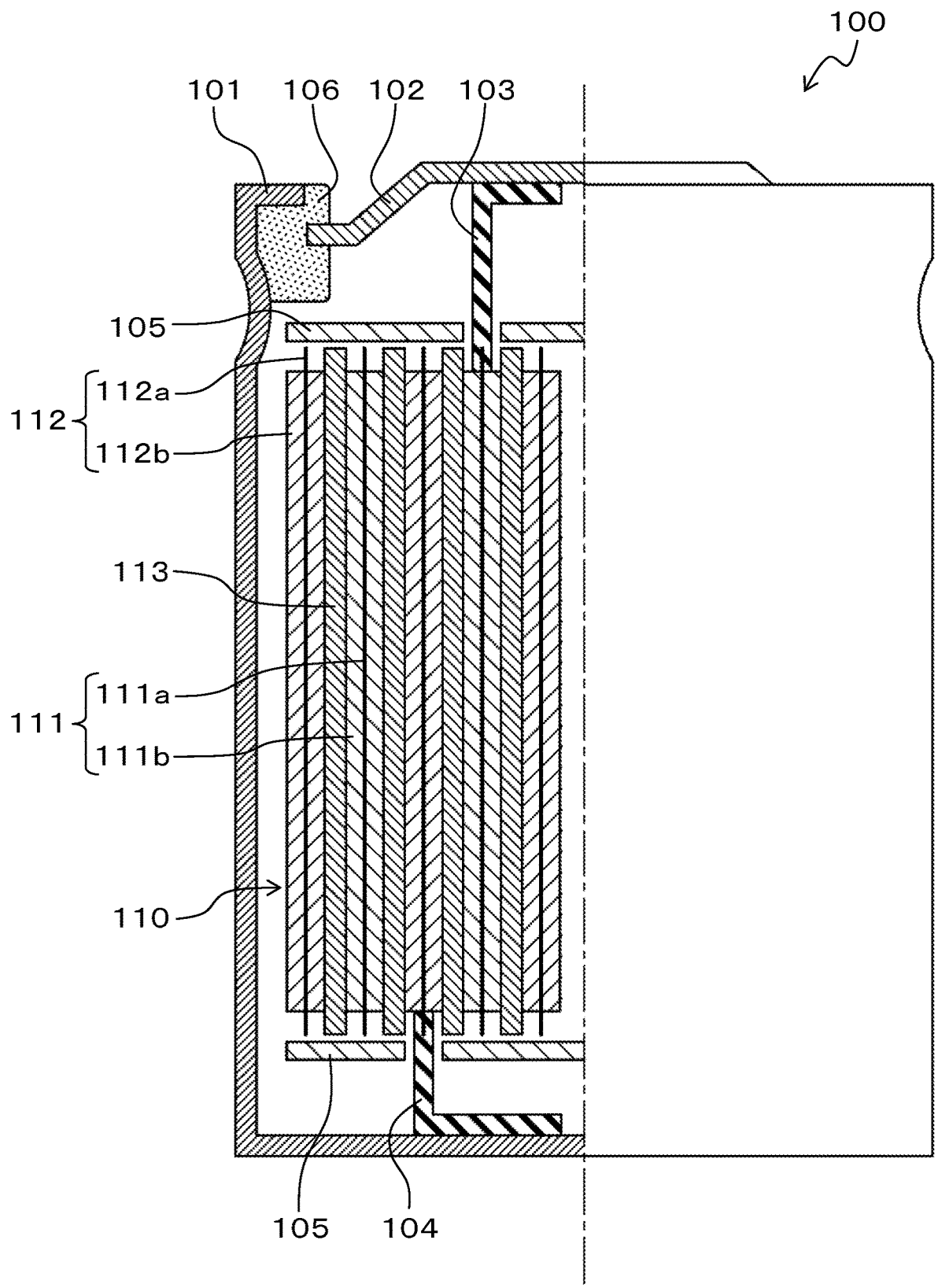
FIG. 2 is a partial cross-sectional view schematically illustrating an exemplary lithium ion secondary battery.

FIG. 2 is a partial cross-sectional view schematically illustrating an exemplary lithium ion secondary battery. As illustrated in FIG. 2, a lithium ion secondary battery 100 has a bottomed cylindrical battery can 101 that houses a non-aqueous electrolyte solution, a rolled electrode group 110 housed in the battery can 101, and a disk-like battery cover 102 that seals a top opening of the battery can 101.

The battery can 101 and battery cover 102 are typically made of a metal material such as stainless steel or aluminum. A cathode 111 has a cathode collector 111a, and a cathode mixture layer 111b formed on a surface of the cathode collector 111a. An anode 112 has an anode collector 112a, and an anode mixture layer 112b formed on a surface of the anode collector 112a.

The cathode collector 111a is typically made of metal foil, expanded metal or perforated metal, made of aluminum, an aluminum alloy or the like. The metal foil can have a thickness of approximately 15 μm or thicker and 25 μm or thinner, for example. The cathode mixture layer 111b contains a cathode active material that contains the aforementioned lithium-transition metal composite oxide. The cathode mixture layer 111b is typically composed of a cathode mixture obtained by mixing the cathode active material, a conductive material, a binder, and so forth.

The anode collector 112a is typically made of metal foil, expanded metal or perforated metal, made of copper, a copper alloy, nickel, a nickel alloy or the like. The metal foil may have a thickness of approximately 7 μm or thicker and 10 μm or thinner, for example. The anode mixture layer 112b contains an anode active material used for a lithium ion secondary battery. The anode mixture layer 112b is composed of an anode mixture obtained by mixing the anode active material, a conductive material, a binder and so forth.

The anode active material employable here can be any of appropriate types of those having been used for an ordinary lithium ion secondary battery. Specific examples of the anode active material include natural graphite; graphitizable materials derived from petroleum coke, pitch coke and so forth, and fired at high temperatures such as 2500° C. or above; mesophase carbon; amorphous carbon; graphite covered with amorphous carbon; carbon materials derived from natural graphite or artificial graphite, with the surface mechanically processed to degrade the crystallinity; carbon materials having organic substance such as polymer, covering on or adhering to the surface; a carbon fiber; metal lithium; alloys of lithium with aluminum, tin, silicon, indium, gallium or magnesium; materials composed of a silicon particle or a carbon particle having metal immobilized on its surface; and oxides of tin, silicon, lithium and titanium. Metals to be immobilized are, for example, lithium, aluminum, tin, indium, gallium, magnesium, and alloys of these metals.

The conductive material may be any of appropriate types of those having been used for an ordinary lithium ion secondary battery. Specific examples of the conductive material include a carbon particle of graphite, acetylene black, furnace black, thermal black, and channel black; and a carbon fiber such as pitch-based and polyacrylonitrile (PAN)-based ones. A single type of these conductive materials may be used independently, or two or more types may be used in a combined manner. An amount of the conductive material can typically be 3% by mass or more and 10% by mass or less, relative to the whole mixture.

The binder may be any of appropriate types of those having been used for an ordinary lithium ion secondary battery. Specific examples of the binder include polyvinylidene fluoride (PVDF), polytetrafluoroethylene, polyhexafluoropropylene, styrene-butadiene rubber, polyacrylonitrile, and modified polyacrylonitrile. A single type of these binders may be used independently, or two or more types may be used in a combined manner. Additionally, a thickening binder such as carboxymethyl cellulose may be used in a combined manner. An amount of the binder can be 2% by mass or more and 10% by mass or less, relative to the whole mixture, for example.

The cathode 111 and the anode 112 may be manufactured according to any of generally used methods for manufacturing electrodes for an ordinary lithium ion secondary battery. The electrodes may be manufactured, for example, through a mixture preparation step in which an active material, a conductive material, and a binder are mixed in a solvent to prepare an electrode mixture; a mixture coating step in which the thus prepared electrode mixture is coated over a substrate such as a current collector, and then dried to form an electrode mixture layer; and a molding step in which the electrode mixture layer is to be press molded.

A mixing means for mixing the materials in the mixture preparation step, employable is appropriate mixing apparatuses such as a planetary mixer, a disper mixer, and a rotation-revolution mixer. The solvent can be, for example, N-methylpyrrolidone, water, N,N-dimethylformamide, N,N-dimethylacetamide, methanol, ethanol, propanol, iso-propanol, ethylene glycol, diethylene glycol, glycerin, dimethyl sulfoxide, and tetrahydrofuran.

As means for coating the thus obtained slurry-like electrode mixture in the mixture coating step, employable are appropriate coating apparatuses such as a bar coater, a doctor blade, and a roll transfer machine. A means for drying the thus coated electrode mixture, employable is appropriate drying apparatuses such as a hot air heater and a radiation heater.

A means for pressure molding the electrode mixture layer in the molding step, employable is appropriate pressure apparatuses such as a roll press. The cathode mixture layer 111b can have a thickness of, for example, approximately 100 μm or thicker and 300 μm or thinner. On the other hand, the anode mixture layer 112b may typically have a thickness of, for example, approximately 20 μm or thicker and 150 μm or thinner. The pressure molded electrode mixture layer may be cut, as necessary, together with the cathode collector, to obtain an electrode for a lithium ion secondary battery with a desired shape.

The rolled electrode group 110 is formed, as illustrated in FIG. 2, by rolling up the strip-like cathode 111 and the anode 112, while placing a separator 113 in between. The rolled electrode group 110 is typically wound around a core made of polypropylene, polyphenylene sulfide or the like, and housed inside the battery can 101.

As the separator 113, employable are microporous films made of polyolefin resins such as polyethylene, polypropylene, and polyethylene-polypropylene copolymer, a polyamide resin, and an aramid resin; and these microporous films with a heat resistant substance such as an alumina particle coated on their surfaces.

As illustrated in FIG. 2, the cathode collector 111a is electrically connected through a cathode lead tab 103 to the battery cover 102. Meanwhile, the anode collector 112a is electrically connected through an anode lead tab 104 to the bottom of the battery can 101. Individually between the rolled electrode group 110 and the battery cover 102, and, between the rolled electrode group 110 and the bottom of the battery can 101, there are disposed insulation plates 105 to prevent short circuit. The cathode lead tab 103 and the anode lead tab 104 are made of materials same as those for the cathode collector 111a and the anode collector 112a, respectively, and are respectively joined to the cathode collector 111a and the anode collector 112a, by spot welding, ultrasonic welding or the like.

A nonaqueous electrolyte solution is injected into the battery can 101. The nonaqueous electrolyte solution may be injected by a method according to which the solution is directly injected, with the battery cover 102 kept open, or by a method according to which the solution is injected through an injection port provided to the battery cover 102, with the battery cover 102 kept closed. The battery can 101 is closed by the battery cover 102 fitted thereto typically by caulking. A sealant 106 made of an insulating resin material is placed between the battery can 101 and the battery cover 102, so as to electrically isolate the battery can 101 and the battery cover 102.

The nonaqueous electrolyte solution contains an electrolyte and a nonaqueous solvent. For the electrolyte, employable are, for example, various types of lithium salt such as $LiPF_6$, $LiBF_4$ and $LiClO_4$. For the nonaqueous solvent, employable are, for example, chain carbonates such as dimethyl carbonate, diethyl carbonate, and ethyl methyl carbonate; cyclic carbonates such as ethylene carbonate, propylene carbonate, and vinylene carbonate; chain carboxylic esters such as methyl acetate, ethyl methyl carbonate, and methyl propyl carbonate; cyclic carboxylic esters such as γ-butyrolactone, and γ-valerolactone; and ethers. Concentration of the electrolyte can be, for example, typically 0.6 M or greater and 1.8 M or less.

The nonaqueous electrolyte solution may contain various additives added thereto, for the purpose of inhibiting oxidative decomposition or reductive decomposition of the electrolyte solution, preventing deposition of metal elements, improving ionic conductivity, or improving flame retardancy. The additives are exemplified by organophosphorus compounds such as trimethyl phosphate, and trimethyl phosphate; organosulfur compounds such as 1,3-propanesultone, and 1,4-butanesultone; carboxylic anhydrides such as polyadipic anhydride and hexahydrophthalic anhydride; and boron compounds such as trimethyl borate, and lithium bis(oxalato)borate.

The thus assembled lithium ion secondary battery 100 uses the battery cover 102 as a cathode external terminal, and the bottom of the battery can 101 as an anode external terminal, and can thereby store externally fed electric power in the rolled electrode group 110. The lithium ion secondary battery 100 also can supply the electric power stored in the rolled electrode group 110 to external devices and so forth. The lithium ion secondary battery 100, although illustrated here as being cylindrical, is not specifically limited regarding a shape and a structure, instead allowing for other appropriate shapes including square, button and laminated sheet, and other structure.

The lithium ion secondary battery according to this embodiment may be used for various applications. The applications may be exemplified by, but not limited to, small-sized power sources for mobile electronic devices and home electric appliances; stationary power sources such as a power storage device, an uninterruptible power supply and a power leveling device; and driving power sources for vessels, railway vehicles, hybrid railway vehicles, hybrid cars, and electric cars. The aforementioned lithium-transition metal composite oxide has a high nickel content, demonstrates a large charge-discharge capacity, demonstrates a high open circuit voltage and therefore excels in output properties, and is therefore particularly suitable for car-borne applications where a high output is required at low SOC.

A chemical composition of the cathode active material used for the lithium ion secondary battery may be confirmed by disassembling a battery, sampling the cathode active material composing the cathode, and by analyzing it by inductively coupled plasma emission spectrometry, or atomic absorption spectrometry. Since a compositional ratio of lithium ("1+a" in the compositional formula (1)) depends on a state of charge, so that the chemical composition of the cathode active material may alternatively be determined on the basis of whether the coefficient "a" satisfies $-0.9 \leq a \leq 0.04$ or not.

EMBODIMENT EXAMPLES

The present invention will be described specifically, referring to embodiment examples, without limiting a technical scope of the present invention.

Cathode active materials according to the embodiment examples of the present invention were synthesized, and evaluated regarding an X-ray diffraction profile, a discharge capacity, an open circuit voltage, and charge-discharge cycle properties (capacity maintenance rate). For control study against the embodiment examples, also cathode active materials according to comparative examples with modified chemical compositions were synthesized, and evaluated in the same way.

Embodiment Example 1

First, lithium carbonate, nickel hydroxide, cobalt carbonate, and manganese carbonate were prepared as starting materials, weighed so as to adjust the mole ratio of metal elements Li:Ni:Co:Mn to 1.02:0.85:0.04:0.11, and pure water was added so as to adjust a solid content ratio to 20% by mass. The mixture was then wet-ground (wet-mixed) using a mill, to prepare a starting slurry such that the average particle diameter is less than 0.3 μm (mixing step S10).

Next, the obtained starting slurry was spray-dried using a disk-type spray dryer (SD-6.3R, from GEA) to obtain granules having average particle diameters larger than or equal to 5 μm and smaller than or equal to 30 μm (granulation step S20). The disk was rotated at 28000 rpm. The dried granule was fired, to fire the lithium-transition metal composite oxide (sintering step S30). More specifically, the granulated product was fired in a continuous oven under an air atmosphere, at 360° C. for 1.5 hours, to obtain a first precursor (first firing step S31). The first precursor was then fired in a sintering furnace having an atmosphere substituted by an oxygen gas, under an oxygen gas flow, at 650° C. for 6 hours, to obtain a second precursor (second firing step S32). The second precursor was then fired (main sintering) in a sintering furnace having an atmosphere substituted by an oxygen gas, under an oxygen gas flow, at 850° C. for 2 hours, to obtain a lithium-transition metal composite oxide (third firing step S33). The fired powder obtained by sintering was classified through a 53 μm mesh sieve, and a powder fraction collected under the sieve was used as a cathode active material.

Embodiment Example 2

A cathode active material was obtained in the same way as described in the Embodiment Example 1, except that a mole ratio of starting materials Li:Ni:Co:Mn was changed to 1.06:0.85:0.04:0.11, and the temperature of main sintering was changed to 840° C.

Embodiment Example 3

A cathode active material was obtained in the same way as described in the Embodiment Example 1, except that a mole ratio of starting materials Li:Ni:Co:Mn was changed to 0.98:0.85:0.04:0.11, and the temperature of main sintering was changed to 860° C.

Embodiment Example 4

A cathode active material was obtained in the same way as described in the Embodiment Example 1, except that a mole ratio of starting materials Li:Ni:Co:Mn was changed to 1.02:0.90:0.03:0.07, and the temperature of main sintering was changed to 840° C.

Embodiment Example 5

A cathode active material was obtained in the same way as described in the Embodiment Example 1, except that a mole ratio of starting materials Li:Ni:Co:Mn was changed to 1.02:0.94:0.02:0.04, and the temperature of main sintering was changed to 830° C.

Embodiment Example 6

A cathode active material was obtained in the same way as described in the Embodiment Example 1, except that a mole ratio of starting materials Li:Ni:Co:Mn was changed to 1.00:0.85:0.02:0.13, and the temperature of main sintering was changed to 860° C.

Embodiment Example 7

A cathode active material was obtained in the same way as described in the Embodiment Example 1, except that a mole ratio of starting materials Li:Ni:Co:Mn was changed to 1.02:0.90:0.04:0.06, and the temperature of main sintering was changed to 840° C.

Embodiment Example 8

A cathode active material was obtained in the same way as described in Example 1, except that titanium oxide was added to the starting materials, a mole ratio of starting materials Li:Ni:Co:Mn:Ti was changed to 1.04:0.80:0.04:0.15:0.01, and the temperature of main sintering was changed to 880° C.

Embodiment Example 9

A cathode active material was obtained in the same way as described in the Embodiment Example 1, except that titanium oxide was added to the starting materials, the mole ratio of starting materials Li:Ni:Co:Mn:Ti was changed to 1.02:0.85:0.04:0.10:0.01, and the temperature of main sintering was changed to 860° C.

Embodiment Example 10

A cathode active material was obtained in the same way as described in the Embodiment Example 1, except that zirconium oxide was added to the starting materials, a mole ratio of starting materials Li:Ni:Co:Mn:Zr was changed to 1.02:0.85:0.04:0.10:0.01, and the temperature of main sintering was changed to 860° C.

Embodiment Example 11

A cathode active material was obtained in the same way as described in the Embodiment Example 1, except that aluminum oxide was added to the starting materials, a mole ratio of starting materials Li:Ni:Co:Mn:Al was changed to 1.02:0.85:0.04:0.10:0.01, and the temperature of main sintering was changed to 860° C.

Embodiment Example 12

A cathode active material was obtained in the same way as described in the Embodiment Example 1, except that magnesium oxide was added to the starting materials, a mole ratio of starting materials Li:Ni:Co:Mn:Mg was changed to 1.02:0.85:0.04:0.10:0.01, and the temperature of main sintering was changed to 860° C.

Embodiment Example 13

A cathode active material was obtained in the same way as described in the Embodiment Example 1, except that titanium oxide was added to the starting materials, and a mole ratio of starting materials Li:Ni:Co:Mn:Ti was changed to 1.02:0.85:0.04:0.09:0.02.

Embodiment Example 14

A cathode active material was obtained in the same way as described in the Embodiment Example 1, except that titanium oxide was added to the starting materials, a mole ratio of starting materials Li:Ni:Co:Mn:Ti was changed to 1.02:0.85:0.04:0.08:0.03, and the temperature of main sintering was changed to 840° C.

Embodiment Example 15

A cathode active material was obtained in the same way as described in the Embodiment Example 1, except that titanium oxide was added to the starting materials, a mole ratio of starting materials Li:Ni:Co:Mn:Ti was changed to 1.02:0.90:0.03:0.06:0.01, and the temperature of main sintering was changed to 840° C.

Embodiment Example 16

A cathode active material was obtained in the same way as described in the Embodiment Example 1, except that titanium oxide was added to the starting materials, a mole ratio of starting materials Li:Ni:Co:Mn:Ti was changed to 1.02:0.90:0.03:0.05:0.02, and the temperature of main sintering was changed to 840° C.

Embodiment Example 17

A cathode active material was obtained in the same way as described in the Embodiment Example 1, except that titanium oxide was added to the starting materials, a mole ratio of starting materials Li:Ni:Co:Mn:Ti was changed to 1.02:0.90:0.03:0.04:0.03, and the temperature of main sintering was changed to 830° C.

Embodiment Example 18

A cathode active material was obtained in the same way as described in the Embodiment Example 1, except that titanium oxide was added while cobalt carbonate was omitted as the starting materials, a mole ratio of starting materials Li:Ni:Mn:Ti was changed to 1.02:0.90:0.08:0.02, and the temperature of main sintering was changed to 840° C.

Comparative Example 1

A cathode active material was obtained in the same way as described in the Embodiment Example 1, except that a mole ratio of starting materials Li:Ni:Co:Mn was changed to 1.04:0.75:0.04:0.21, and the temperature of main sintering was changed to 860° C.

Comparative Example 2

A cathode active material was obtained in the same way as described in the Embodiment Example 1, except that a mole ratio of starting materials Li:Ni:Co:Mn was changed to 1.08:0.85:0.04:0.11, and the temperature of main sintering was changed to 840° C.

Comparative Example 3

A cathode active material was obtained in the same way as described in the Embodiment Example 1, except that a mole ratio of starting materials Li:Ni:Co:Mn was changed to 0.96:0.85:0.04:0.11, and the temperature of main sintering was changed to 860° C.

Comparative Example 4

A cathode active material was obtained in the same way as described in the Embodiment Example 1, except that a mole ratio of starting materials Li:Ni:Co:Mn was changed to 1.04:0.80:0.10:0.10, and the temperature of main sintering was changed to 860° C.

Comparative Example 5

A cathode active material was obtained in the same way as described in the Embodiment Example 1, except that titanium oxide was added to the starting materials, a mole ratio of starting materials Li:Ni:Co:Mn:Ti was changed to 1.04:0.80:0.15:0.04:0.01, and the temperature of main sintering was changed to 840° C.

(Measurement of Chemical Composition and Specific Surface Area of Cathode Active Material)

Chemical compositions of the thus synthesized cathode active materials were analyzed by high frequency induction coupled plasma emission spectrometry using an ICP-AES apparatus "OPTIMA8300" (from PerkinElmer Inc.). Oxygen contents (a in the compositional formula (1)) in the cathode active materials were analyzed by inert gas fusion-infrared absorption spectrometry. From results, all of the cathode active materials of the Embodiment Examples 1 to 18, and the cathode active materials of the Comparative Examples 1 to 5 were confirmed to have chemical compositions listed in Table 2, with only lithium contents different from the amounts of an input, and to satisfy $-0.2<\alpha<0.2$. Compositional ratios (c/d) of cobalt and manganese of the individual cathode active materials are listed in Table 2. The specific surface areas of the cathode active materials were determined by the BET method using an automatic surface area measuring instrument "BELCAT" (from BEL Japan, Inc.). Results are summarized in Table 2.

(Powder X-Ray Diffractometry and Crystal Structure Analysis)

Crystal structures of the thus synthesized cathode active materials were measured using a powder X-ray diffractometer "RINT-UltimaIII" (from Rigaku Corporation) according to the conditions below. First, a powder of each cathode active material thus prepared was filled in a well of a glass sample plate, and a surface of the powder was smoothened with a glass plate. X-ray diffraction spectra (profiles) were measured under the conditions below. Radiation source: CuKα, tube voltage: 48 kV, tube current: 28 mA, scanning range: $15°≤2θ≤80°$, scanning speed: 1.0°/min, sampling intervals: 0.02°/step, divergence slit (open angle): 0.5°, scattering slit (open angle): 0.5°, receiving slit (open width): 0.15 mm. All of the cathode active materials of the Embodiment Examples 1 to 18 and the cathode active materials of the Comparative Examples 1 to 5 were found to be assigned to a hexagonal system.

Next, the thus obtained X-ray diffraction spectra were processed to eliminate diffraction peaks caused by $K\alpha_2$ radiation, to eliminate the background intensity, and to smoothen diffraction peaks, using a powder X-ray diffraction pattern overall analyzing software "Jade7" (from Rigaku Corporation). Integrated intensity $I_{(003)}$ of a diffraction peak assigned to a Miller index plane (003), and integrated intensity $I_{(104)}$ of a diffraction peak assigned to a Miller index plane (104) were then calculated, to determine an intensity ratio of diffraction peaks $I_{(003)}/I_{(104)}$. As a full width at half maximum of a diffraction peak assigned to the Miller index plane (003), a range of a diffraction angle over which a peak intensity becomes equal to or more than a half of a maximum intensity was determined. Also an a-axis lattice constant, and a c-axis lattice constant of hexagonal unit lattice were determined from measured diffraction angles of six in total of diffraction peaks ((hkl)=(003), (101), (006), (012), (104), (015)) that appeared within a range of diffraction angle 2θ from 15 to 50°, using the least squares method.

Further, the ratio of cation mixing by nickel at the lithium sites in the crystal structure (the site occupancy of nickel at the 3a site) was measured with the chemical composition and X-ray diffraction spectrum of the cathode active material by using the Rietveld analysis software "Rietan-FP". Refinement was performed on the assumption that the cathode active material has an $\alpha$-NaFeO$_2$ type crystal structure, that the 3a site in the crystal structure belonging to the space group R-3m are occupied by Li or Ni, that the 3b sites are occupied by Co, Mn, or M or remaining Li or Ni, and that the 6c sites are occupied by O. Then, the cation mixing ratio (the site occupancy of nickel at the 3a site) was determined by calculating the ratio of the 3a site occupied by nickel relative to all the 3a site. Results are summarized in Table 2.

(Discharge Capacity, Open Circuit Voltage, Capacity Maintenance Rate)

Each of the thus synthesized cathode active materials was used as a cathode material to make a lithium ion secondary battery, and a discharge capacity, an open circuit voltage, and a capacity maintenance rate of the lithium ion secondary battery were determined. First, the prepared cathode active material, a carbon-based conductive material, and a binder preliminarily dissolved in N-methyl-2-pyrrolidone (NMP) were mixed in a ratio by mass of 94:4.5:1.5. A cathode material slurry, homogenously mixed, was then coated on a cathode collector composed of an aluminum foil of 20 μm thick, so as to adjust an amount of coating to 10 mg/cm². Next, the cathode mixture slurry coated on the cathode collector was fired at 120° C. to vaporize the solvent, to form a cathode mixture layer. The cathode mixture layer was hot-pressed, and punched to produce a cathode in a form of a 15 mm diameter disk.

Next, a lithium ion secondary battery was made using the thus manufactured cathode, an anode, and a separator. For the anode, used was metal lithium that had been punched into a form of 16-mm-diameter disk. For the separator, used was a 30-μm-thick porous separator made of polypropylene. The cathode and the anode were positioned to face each other in a nonaqueous electrolyte solution, while placing the separator in between, and assembled into a lithium ion secondary battery. The nonaqueous electrolyte solution used here was a solution prepared by dissolving 1.0 mol/L of LiPF$_6$ into a 3:7 (in volume ratio) mixed solvent of ethylene carbonate and dimethyl carbonate.

The thus manufactured lithium ion secondary battery was charged in a 25° C. environment, at a constant current of 40 A/kg on the basis of a weight of a cathode mixture, and at a constant voltage up to an upper limit potential of 4.3 V. The battery was then discharged at a constant current of 40 A/kg on the basis of a weight of the cathode mixture, and at a constant voltage down to a lower limit potential of 2.5 V. A discharge capacity (initial capacity) was thus measured. Results are summarized in Table 2 and FIG. 3.

Next, the lithium secondary battery having been thus measured regarding the initial capacity was then charged in a 25° C. environment, at a constant current of 40 A/kg on the basis of a weight of the cathode mixture, and at a constant voltage up to an upper limit potential of 4.3 V. The battery was then discharged at a constant current of 40 A/kg on the basis of a weight of the cathode mixture, and at a constant voltage down to a lower limit potential of 2.5 V. The battery was then charged up to 10%, which is a low SOC, of the charge capacity in a discharge process at a current of 40 A/kg on the basis of a weight of the cathode mixture, and open circuit voltage (OCV) was measured after pausing for 2 hours. The battery was then discharged in a −20° C. environment at a constant voltage of 20, 40 or 60 A/kg on the basis of a weight of the cathode mixture for 10 seconds. Direct-current internal resistance R (=ΔV/I) at −20° C. measured 10 seconds after the start of discharge was determined, from a voltage difference ΔV between OCV and voltage measured 10 seconds after the start of discharge, and slope of current I. Results are shown in Table 2 and FIG. 4.

Another lithium secondary battery having been measured separately regarding the initial capacity was further proceeded to a single charge-discharge cycle under the same conditions. The battery had a charge-discharge efficiency in such a second cycle of 99% or greater, and to be almost free of side reaction. Regarding such charging in the second cycle, a dQ/dV curve was drawn with a voltage V plotted on an abscissa, and with a dQ/dV, which is a charge capacity Q differentiated by voltage V, plotted on an ordinate. Data of a voltage V and the charge capacity Q were acquired at 20 second intervals, and a slope of $\Delta Q/\Delta V$ calculated for every infinitesimal interval was defined as a dQ/dV. A ratio (dQ/dV ratio) of a maximum value of a peak height in a voltage range from 4.1 to 4.3 V (maximum value of a dQ/dV), relative to a maximum value of a peak height in a voltage range from 3.7 to 3.8 V (maximum value of a dQ/dV), was determined. Results are shown in Table 2.

Next, the battery was charged in a 25° C. environment, at a constant current of 100 A/kg on the basis of a weight of the cathode mixture, and at a constant voltage up to an upper limit potential of 4.3 V. The battery was then discharged at a constant current of 100 A/kg on the basis of the weight of cathode mixture, and at a constant voltage down to a lower limit potential of 2.5 V. This cycle was repeated 100 times, and a discharge capacity after the 100th cycle was measured. A percentage of a discharge capacity after the 100th cycle, relative to the initial capacity, was determined as a capacity maintenance rate. Results are shown in Table 2 and FIG. 5.

TABLE 2

| | Chemical composition (Measured Value) $Li_{1+a}Ni_bCo_cMn_dO_{2+a}$ | | | | | | | | Lattice constant | | Diffraction peak | |
|---|---|---|---|---|---|---|---|---|---|---|---|---|
| | | | | | | | | | | | Intensity | Full width at half |
| | Li (1 + a) | Ni (b) | Co (c) | Mn (d) | Ti | Zr | Al (e) | Mg | Co/Mn (c/d) | a-axis [Å] | c-axis [Å] | ratio $I_{(003)}/I_{(104)}$ | maximum (003)[deg] |
| Embodiment Example 1 | 1.00 | 0.85 | 0.04 | 0.11 | — | — | — | — | 0.364 | 2.878 | 14.225 | 1.31 | 0.115 |
| Embodiment Example 2 | 1.04 | 0.85 | 0.04 | 0.11 | — | — | — | — | 0.364 | 2.878 | 14.224 | 1.36 | 0.110 |
| Embodiment Example 3 | 0.96 | 0.85 | 0.04 | 0.11 | — | — | — | — | 0.364 | 2.879 | 14.225 | 1.29 | 0.123 |
| Embodiment Example 4 | 1.00 | 0.90 | 0.03 | 0.07 | — | — | — | — | 0.429 | 2.878 | 14.215 | 1.44 | 0.118 |
| Embodiment Example 5 | 1.00 | 0.94 | 0.02 | 0.04 | — | — | — | — | 0.500 | 2.879 | 14.216 | 1.51 | 0.119 |
| Embodiment Example 6 | 0.98 | 0.85 | 0.02 | 0.13 | — | — | — | — | 0.154 | 2.878 | 14.223 | 1.22 | 0.127 |
| Embodiment Example 7 | 1.00 | 0.90 | 0.04 | 0.06 | — | — | — | — | 0.667 | 2.878 | 14.220 | 1.51 | 0.113 |
| Embodiment Example 8 | 1.02 | 0.80 | 0.04 | 0.15 | 0.01 | — | — | — | 0.267 | 2.878 | 14.227 | 1.25 | 0.119 |
| Embodiment Example 9 | 1.00 | 0.85 | 0.04 | 0.10 | 0.01 | — | — | — | 0.400 | 2.878 | 14.230 | 1.34 | 0.116 |
| Embodiment Example 10 | 1.00 | 0.85 | 0.04 | 0.10 | — | 0.01 | — | — | 0.400 | 2.878 | 14.222 | 1.29 | 0.113 |
| Embodiment Example 11 | 1.00 | 0.85 | 0.04 | 0.10 | — | — | 0.01 | — | 0.400 | 2.878 | 14.233 | 1.31 | 0.115 |
| Embodiment Example 12 | 1.00 | 0.85 | 0.04 | 0.10 | — | — | — | 0.01 | 0.400 | 2.878 | 14.237 | 1.24 | 0.119 |
| Embodiment Example 13 | 1.00 | 0.85 | 0.04 | 0.09 | 0.02 | — | — | — | 0.444 | 2.878 | 14.233 | 1.33 | 0.110 |
| Embodiment Example 14 | 1.00 | 0.85 | 0.04 | 0.08 | 0.03 | — | — | — | 0.500 | 2.879 | 14.240 | 1.28 | 0.101 |
| Embodiment Example 15 | 1.00 | 0.90 | 0.03 | 0.06 | 0.01 | — | — | — | 0.500 | 2.880 | 14.219 | 1.45 | 0.118 |
| Embodiment Example 16 | 1.00 | 0.90 | 0.03 | 0.05 | 0.02 | — | — | — | 0.600 | 2.880 | 14.226 | 1.48 | 0.118 |
| Embodiment Example 17 | 1.00 | 0.90 | 0.03 | 0.04 | 0.03 | — | — | — | 0.750 | 2.881 | 14.239 | 1.43 | 0.117 |
| Embodiment Example 18 | 1.01 | 0.90 | — | 0.08 | 0.02 | — | — | — | 0.000 | 2.880 | 14.226 | 1.27 | 0.108 |
| Comparative Example 1 | 1.02 | 0.75 | 0.04 | 0.21 | — | — | — | — | 0.190 | 2.874 | 14.230 | 1.14 | 0.134 |
| Comparative Example 2 | 1.06 | 0.85 | 0.04 | 0.11 | — | — | — | — | 0.364 | 2.876 | 14.221 | 1.17 | 0.101 |
| Comparative Example 3 | 0.94 | 0.85 | 0.04 | 0.11 | — | — | — | — | 0.364 | 2.877 | 14.227 | 1.12 | 0.128 |
| Comparative Example 4 | 1.02 | 0.80 | 0.10 | 0.10 | — | — | — | — | 1.000 | 2.873 | 14.220 | 1.28 | 0.109 |
| Comparative Example 5 | 1.02 | 0.80 | 0.15 | 0.04 | 0.01 | — | — | — | 3.750 | 2.869 | 14.215 | 1.34 | 0.124 |

| | Specific surface area [m²/g] | dQ/dV ratio | Ratio of cation mixing [%] | Discharge capacity [Ah/kg] | Open circuit voltage 25° C.[V] | Internal resistance −20° C.[Ω] | 100th cycle capacity maintenance rate[%] |
|---|---|---|---|---|---|---|---|
| Embodiment Example 1 | 0.61 | 1.03 | 3.11 | 207 | 3.59 | 648 | 92 |
| Embodiment Example 2 | 0.44 | — | — | 202 | 3.58 | — | 91 |

TABLE 2-continued

|  | | | | | | | |
|---|---|---|---|---|---|---|---|
| Embodiment Example 3 | 1.06 | — | — | 200 | 3.58 | — | 90 |
| Embodiment Example 4 | 0.75 | 2.00 | 3.68 | 214 | 3.60 | 591 | 93 |
| Embodiment Example 5 | 0.86 | — | — | 217 | 3.61 | — | 91 |
| Embodiment Example 6 | 0.99 | — | — | 198 | 3.58 | — | 92 |
| Embodiment Example 7 | 1.14 | — | — | 215 | 3.60 | — | 89 |
| Embodiment Example 8 | 0.91 | — | — | 190 | 3.57 | — | 90 |
| Embodiment Example 9 | 0.74 | 1.06 | 2.76 | 205 | 3.59 | 679 | 93 |
| Embodiment Example 10 | 0.87 | — | — | 205 | 3.59 | 695 | 94 |
| Embodiment Example 11 | 0.66 | — | — | 202 | 3.59 | 717 | 93 |
| Embodiment Example 12 | 0.70 | — | — | 198 | 3.58 | 744 | 91 |
| Embodiment Example 13 | 0.84 | 0.97 | — | 202 | 3.59 | — | 96 |
| Embodiment Example 14 | 0.73 | 0.77 | — | 196 | 3.58 | — | 97 |
| Embodiment Example 15 | 0.81 | 1.91 | — | 210 | 3.60 | 551 | 94 |
| Embodiment Example 16 | 0.63 | 1.67 | 2.48 | 206 | 3.59 | — | 94 |
| Embodiment Example 17 | 0.92 | 1.26 | — | 200 | 3.58 | — | 96 |
| Embodiment Example 18 | 0.45 | — | — | 196 | 3.60 | 620 | 90 |
| Comparative Example 1 | 1.25 | 0.27 | 4.60 | 176 | 3.53 | 1124 | 80 |
| Comparative Example 2 | 0.29 | 0.64 | 4.14 | 185 | 3.56 | 956 | 86 |
| Comparative Example 3 | 1.10 | 0.48 | — | 182 | 3.56 | — | 75 |
| Comparative Example 4 | 0.42 | 0.37 | — | 187 | 3.56 | — | 86 |
| Comparative Example 5 | 0.58 | 0.53 | 2.75 | 194 | 3.55 | 873 | 94 |

As shown in Table 2, each of the Embodiment Examples 1 to 18 satisfies the chemical composition represented by the compositional formula (1), and each composition ration (c/d) of cobalt and manganese is 0.75 or less. Thus, in each Embodiment Example, the a-axis lattice constant is 2.878 Å or greater, the intensity ratio of diffraction peaks $I_{(003)}/I_{(104)}$ is 1.2 or greater, the full width at half maximum of the diffraction peak assigned to a Miller index plane (003) is 0.130 or less, and a layered structure that has a certain level of a crystallite size and a less lattice distortion but having a large a-axis lattice constant was formed. As a result, a large discharge capacity, exceeding 200 Ah/kg, was obtained for most of the Embodiment Examples, accompanied by good charge-discharge cycle properties. The Embodiment Examples had a relatively high value of an open circuit voltage at a low SOC of 10%, proving that they were able to achieve a high output and a low internal resistance at a low SOC. The Embodiment Examples had dQ/dV ratios of 0.70 or greater, to achieve a sufficiently large capacity maintenance rate, and to be able to retain a reasonably acceptable level of a rate of utilizing a change in nickel valence. It was also found that the cation mixing ratio was a low value less than 4%.

In contrast, the Comparative Example 1 with a less content of Ni failed to obtain a large discharge capacity. It also failed to obtain a large a-axis lattice constant and a large intensity ratio of diffraction peaks $I_{(003)}/I_{(104)}$, suggesting possibilities of lower crystallinity. The cation mixing ratio is 4% or more, and it was found that defects in the crystal structure adversely affect the discharge capacity and the like.

The Comparative Example 2, which is Li-rich due to a large input of lithium carbonate, failed to obtain a large a-axis lattice constant and a large intensity ratio of diffraction peaks $I_{(003)}/I_{(104)}$, suggesting possibilities of degraded crystallinity. The cation mixing ratio is 4% or more, and it was found that defects in the crystal structure adversely affect the discharge capacity or the like.

The Comparative Example 3, which is Li-poor due to a small input of lithium carbonate, had a large content of trivalent nickel and so forth and a small a-axis lattice constant, and therefore failed to obtain a large discharge capacity, good charge-discharge cycle properties and good output properties.

The Comparative Example 4, which is Co-rich and has a large compositional ratio (c/d) of cobalt and manganese, failed to obtain a large a-axis lattice constant, suggesting that a proportion of divalent nickel could not increase enough. With such a chemical composition, the material cost became relatively high, but neither a large charge-discharge capacity nor good charge-discharge cycle properties were obtainable.

The Comparative Example 5, which additionally contains titanium but is Co-rich and has a large compositional ratio (c/d) of cobalt and manganese, achieved a cation mixing ratio of 4% or less but failed to obtain a large a-axis lattice constant, suggesting the possibility that a lattice distortion or a change in a crystal structure which occurs in association with intercalation and deintercalation of lithium ions could not fully reduced. With such a chemical composition, the material cost became relatively high, the full width at half maximum of a diffraction peak assigned to a Miller index plane (003) became large, the open circuit voltage at a room temperature (25° C.) became low, and a direct-current internal resistance was relatively high both at a room temperature (25° C.) and at a low temperature (−20° C.).

Figure 3:
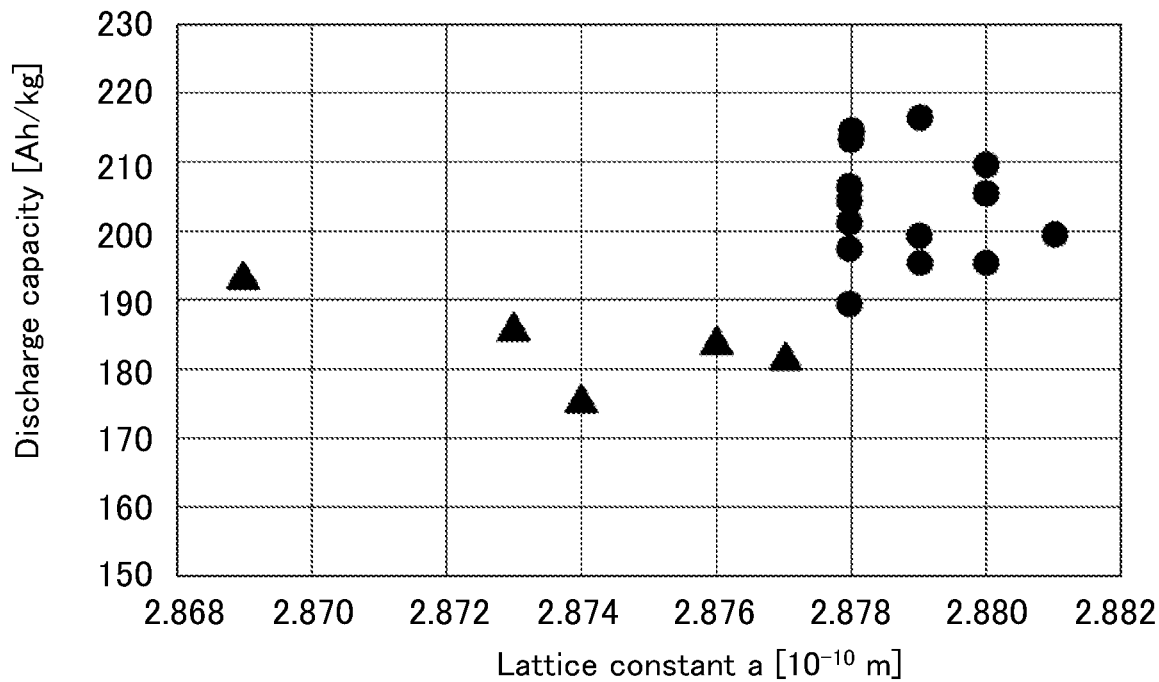
FIG. 3 is a diagram illustrating relations between an a-axis lattice constant and a discharge capacity.
Figure 4:
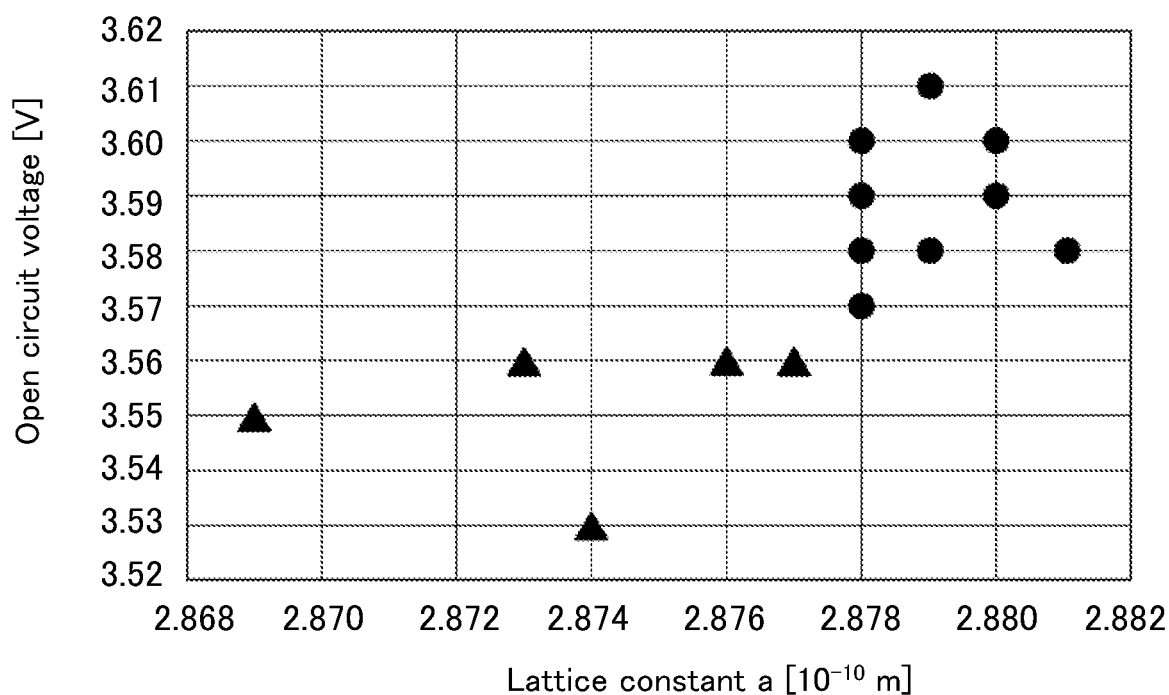
FIG. 4 is a diagram illustrating relations between an a-axis lattice constant and an open circuit voltage.
Figure 5:
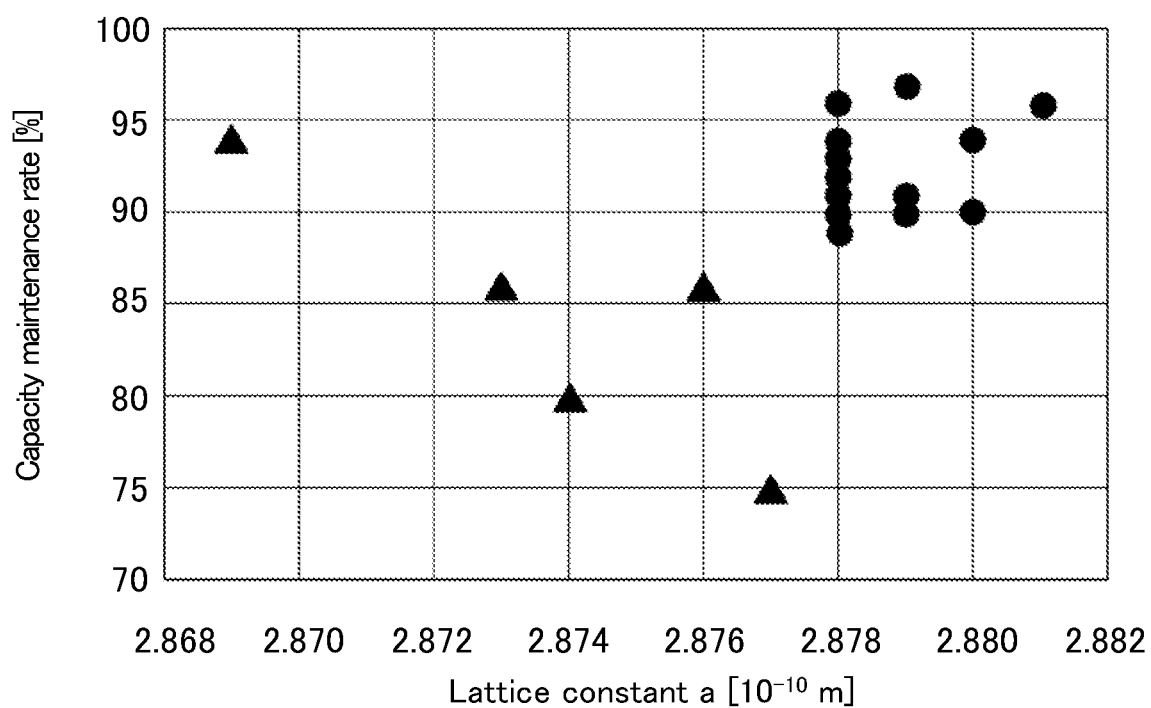
FIG. 5 is a diagram illustrating relations between an a-axis lattice constant and a capacity maintenance rate.

FIG. 3 is a diagram illustrating relations between an a-axis lattice constant and a discharge capacity of the lithium-transition metal composite oxide. FIG. 4 is a diagram illustrating relations between an a-axis lattice constant and an open circuit voltage of the lithium-transition metal composite oxide. FIG. 5 is a diagram illustrating relations between an a-axis lattice constant and a capacity maintenance rate of the lithium-transition metal composite oxide. In FIGS. 3 to 5, ● represents measured values for the cathode active materials according to the Embodiment Examples, and ▲ represents measured values for the cathode active material according to the Comparative Examples.

As can be seen in FIGS. 3 to 5, there are high correlations between an a-axis lattice constant and each of a capacity, charge-discharge cycle properties, and output properties of the lithium ion secondary battery. When an a-axis lattice constant is 2.878 Å or greater, a large discharge capacity, as well as a high open circuit voltage and a high capacity maintenance rate were obtained. This is supposedly because, even with a high Ni content, manganese that stably exists in a tetravalent state could increase a proportion of divalent nickel, making it possible to inhibit a change in a crystal structure or degradation of crystallinity which occurs in association with intercalation and deintercalation of lithium ions. This effect was obtained without adding metal elements such as Ti other than Li, Ni, Co, and Mn, and it is considered that this effect is excellent from the viewpoint of productivity of the cathode active material.

Figure 6:
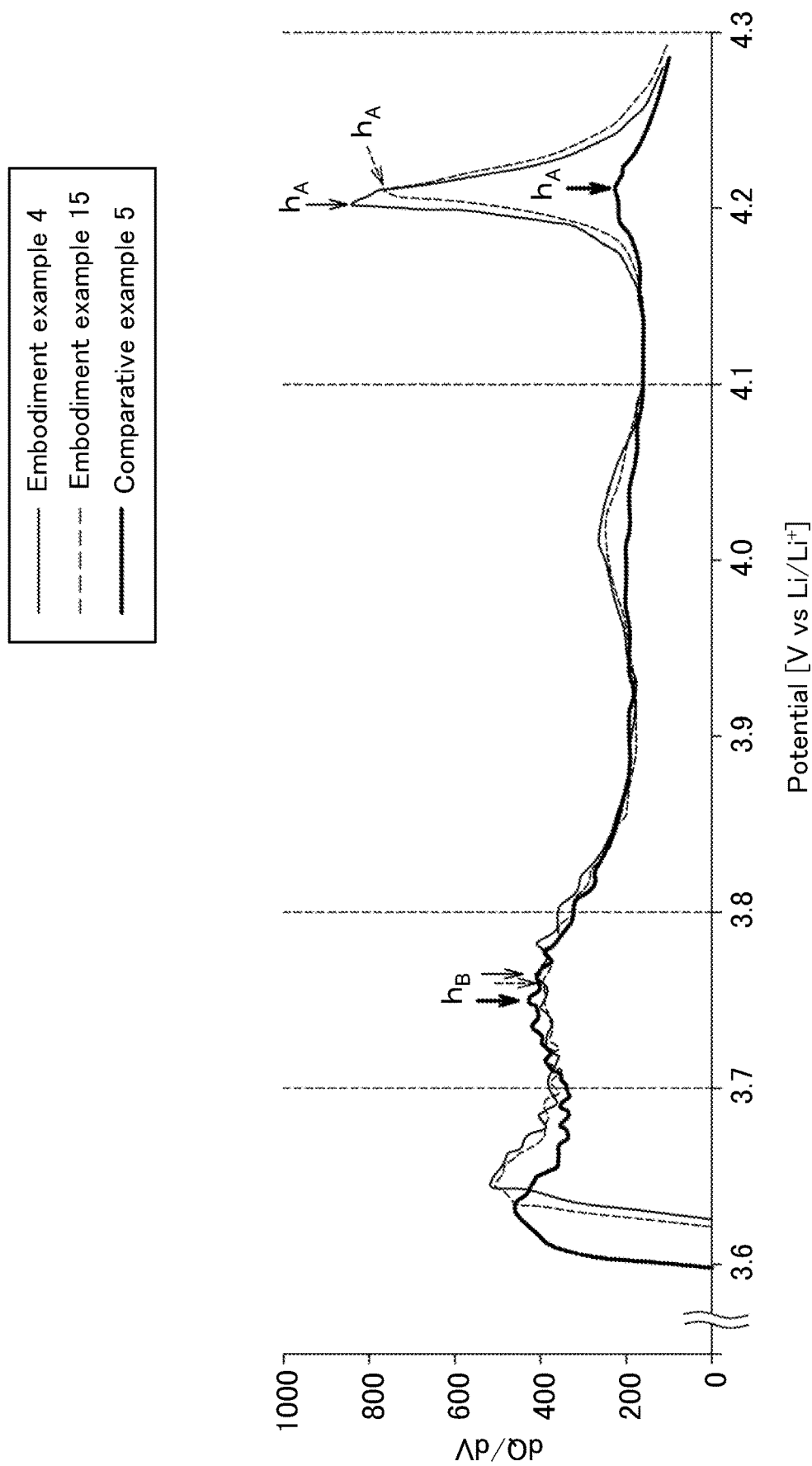
FIG. 6 is dQ/dV curves of lithium ion secondary batteries according to embodiment examples and comparative examples.
Figure 7:
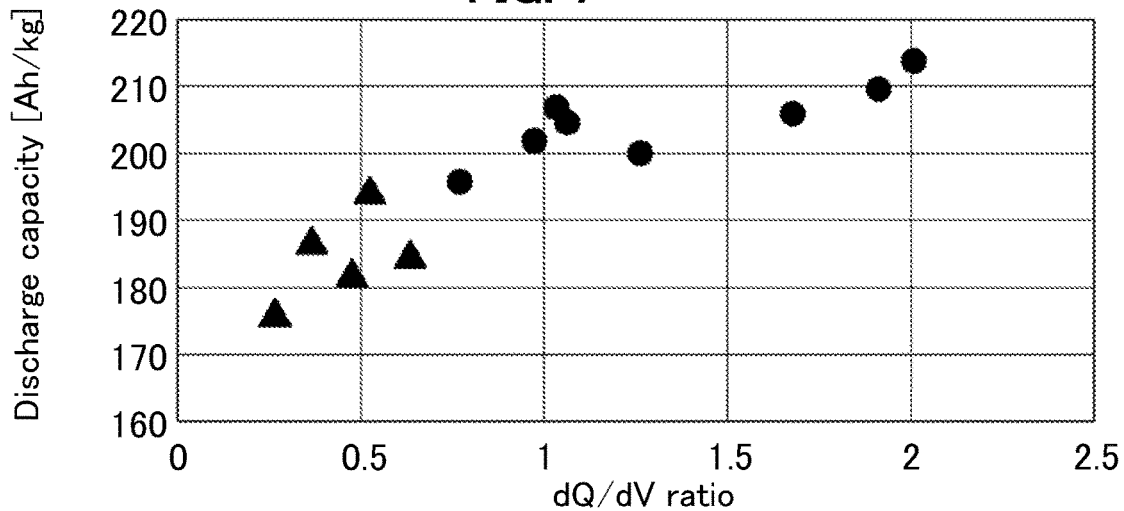
FIG. 7 is a diagram illustrating relations between a dQ/dV ratio and a discharge capacity.
Figure 8:
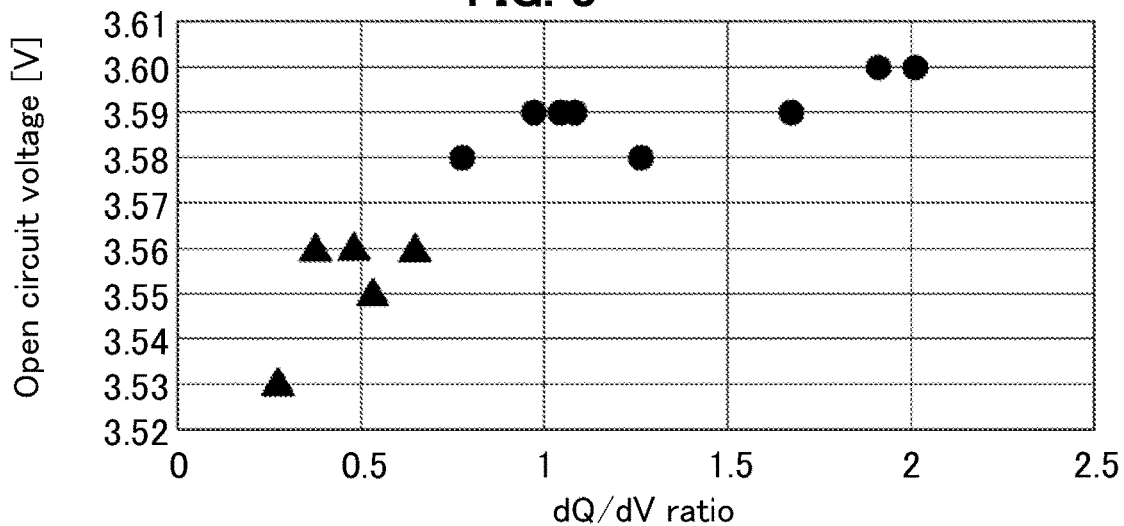
FIG. 8 is a diagram illustrating relations between a dQ/dV ratio and an open circuit voltage.
Figure 9:
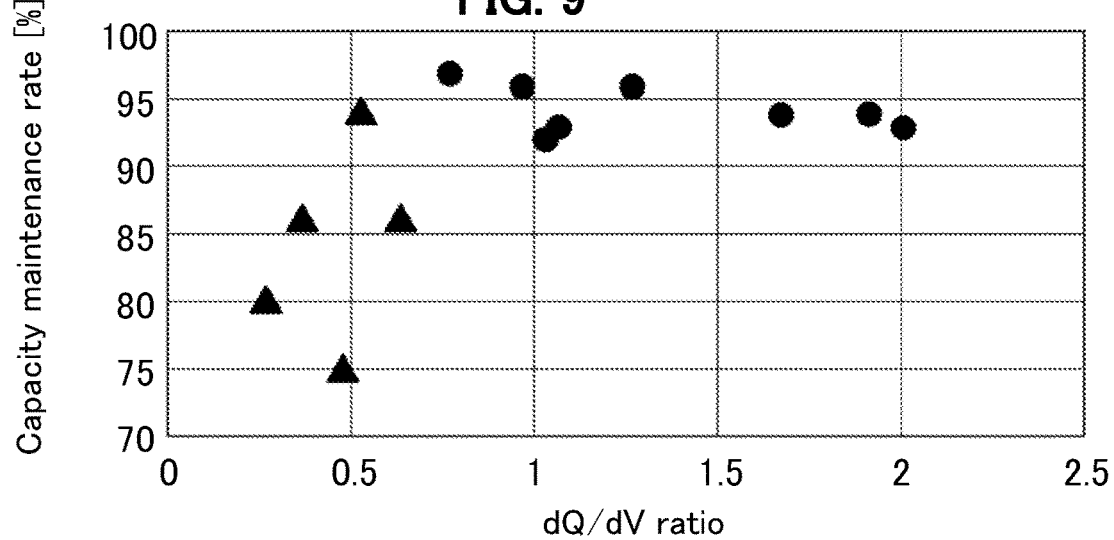
FIG. 9 is a diagram illustrating relations between a dQ/dV ratio and a capacity maintenance rate.

FIG. 6 is dQ/dV curves of lithium ion secondary batteries according to the Embodiment Examples and the Comparative Example. FIG. 7 is a diagram illustrating relations between a dQ/dV ratio and a discharge capacity. FIG. 8 is a diagram illustrating relations between a dQ/dV ratio and an open circuit voltage. FIG. 9 is a diagram illustrating relations between a dQ/dV ratio and a capacity maintenance rate.

FIG. 6 illustrates results of the Embodiment Examples 4, 15 and the Comparative Example 5. In FIGS. 7 to 9, ● represents results of the Embodiment Examples 1, 4, 8, 9, 13 to 17, and ▲ represents results of the Comparative Examples 1 to 5. A dQ/dV ratio means a ratio ($h_A/h_B$) of a maximum value of a peak height ($h_A$) in a voltage range from 4.1 to 4.3 V, relative to a maximum value of a peak height ($h_B$) in a voltage range from 3.7 to 3.8 V.

As illustrated in FIG. 6, each of the Embodiment Examples, with a small compositional ratio (c/d) of cobalt and manganese, showed an intense peak in a voltage range from 4.1 to 4.3 V. This peak indicates occurrence of a phase transition towards the H3 phase, meaning a sufficient change in nickel valence to a tetravalent state. Meanwhile, the Comparative Example did not show intense peak in a voltage range from 4.1 to 4.3 V. It was considered that a change in nickel valance was insufficient, and so that a phase change to the H3 phase did not fully proceed.

FIGS. 7 to 9 teach a strong positive correlation between a dQ/dV ratio, and each of a capacity, charge-discharge cycle properties and output properties of the lithium ion secondary battery. When a dQ/dV ratio is 0.70 or greater, obtained were a large discharge capacity value of 190 Ah/kg or greater, a high open circuit voltage value of 3.57 V or higher, and a high capacity maintenance rate of 89% or greater. It is considered that employment of chemical composition and manufacturing conditions, capable of increasing a dQ/dV ratio, inhibited a change in a crystal structure or degradation of crystallinity which occurs in association with intercalation and deintercalation of lithium ions.

100 Lithium ion secondary battery
101 Battery can
102 Battery cover
103 Cathode lead tab
104 Anode lead tab
105 Insulation plate
106 Sealant
110 Rolled electrode group
111 Cathode
111a Cathode collector
111b Cathode mixture layer
112 Anode
112b Anode mixture layer
113 Separator

The invention claimed is:

1. A cathode active material used for a lithium ion secondary battery comprising:
   a lithium transition metal composite oxide represented by the following Formula (1):

$$Li_{1+a}Ni_bCo_cMn_dMeO_{2+\alpha} \qquad (1)$$

where M contains at least one kind of metal elements selected from a group consisting of Al, Ti, Zn, Ga, Zr, Mo, Nb, V, Sn, Mg, Ta, Ba, W and Y; a, b, c, d, e, and a are respectively numbers satisfying the following conditions: −0.04≤a≤0.04, 0.80≤b<1.00, 0.01≤c≤0.04, 0<d<0.20, b+c+d+e=1, −0.2<α<0.2, wherein c and d in the Formula (1) satisfy 0<c/d≤0.75.

2. The cathode active material used for a lithium ion secondary battery according to the claim 1, wherein
   the lithium transition metal composite oxide represented by the Formula (1) has an α-NaFeO₂ type crystal structure, and
   a site occupancy of nickel at a 3a site in a crystal structure belonging to a space group R-3m is less than 4%.

3. The cathode active material used for a lithium ion secondary battery according to the claim 1, having an X-ray powder diffraction spectrum obtained using a CuKα radiation, wherein
   $I_{(003)}$ and $I_{(104)}$ are defined as an integrated intensity of a diffraction peak assigned to planes (003) and (104) respectively, and
   a value of $I_{(003)}/I_{(104)}$ is 1.2 or more.

4. The cathode active material used for a lithium ion secondary battery according to the claim 1, having an X-ray powder diffraction spectrum obtained using a CuKα radiation, wherein
   a full width at half maximum of a diffraction peak assigned to a plane (003) is 0.130° or smaller.

5. The cathode active material used for a lithium ion secondary battery according to the claim 1, wherein
   an a-axis lattice constant of a unit lattice is 2.878×10⁻¹⁰ m or more.

6. The cathode active material used for a lithium ion secondary battery according to the claim 1 having a specific surface area of 0.2 m²/g or more and 1.5 m²/g or less.

7. A lithium ion secondary battery comprising a cathode comprising the cathode active material used for a lithium ion secondary battery according to the claim 1.

8. The cathode active material used for a lithium ion secondary battery according to the claim 2, having an X-ray powder diffraction spectrum obtained using a CuKα radiation, wherein
$I_{(003)}$ and $I_{(104)}$ are defined as an integrated intensity of a diffraction peak assigned to planes (003) and (104) respectively, and
a value of $I_{(003)}/I_{(104)}$ is 1.2 or more.

9. The cathode active material used for a lithium ion secondary battery according to the claim 2, having an X-ray powder diffraction spectrum obtained using a CuKα radiation, wherein
a full width at half maximum of a diffraction peak assigned to a plane (003) is 0.130° or smaller.

10. The cathode active material used for a lithium ion secondary battery according to the claim 3, having an X-ray powder diffraction spectrum obtained using a CuKα radiation, wherein
a full width at half maximum of a diffraction peak assigned to a plane (003) is 0.130° or smaller.

11. The cathode active material used for a lithium ion secondary battery according to the claim 8, having an X-ray powder diffraction spectrum obtained using a CuKα radiation, wherein
a full width at half maximum of a diffraction peak assigned to a plane (003) is 0.130° or smaller.

12. The cathode active material used for a lithium ion secondary battery according to the claim 2, wherein
an a-axis lattice constant of a unit lattice is $2.878 \times 10^{-10}$ m or more.

13. The cathode active material used for a lithium ion secondary battery according to the claim 3, wherein
an a-axis lattice constant of a unit lattice is $2.878 \times 10^{-10}$ m or more.

14. The cathode active material used for a lithium ion secondary battery according to the claim 8, wherein
an a-axis lattice constant of a unit lattice is $2.878 \times 10^{-10}$ m or more.

15. The cathode active material used for a lithium ion secondary battery according to the claim 9, wherein
an a-axis lattice constant of a unit lattice is $2.878 \times 10^{-10}$ m or more.

16. The cathode active material used for a lithium ion secondary battery according to the claim 10, wherein
an a-axis lattice constant of a unit lattice is $2.878 \times 10^{-10}$ m or more.

17. The cathode active material used for a lithium ion secondary battery according to the claim 11, wherein
an a-axis lattice constant of a unit lattice is $2.878 \times 10^{-10}$ m or more.

18. The cathode active material used for a lithium ion secondary battery according to the claim 1, wherein M is Ti.

* * * * *